(12) United States Patent
Bell-Booth

(10) Patent No.: US 11,930,316 B2
(45) Date of Patent: Mar. 12, 2024

(54) WEARABLE DEVICE

(71) Applicant: Earshots Limited, Palmerston North (NZ)

(72) Inventor: James Bell-Booth, Palmerston North (NZ)

(73) Assignee: EARSHOTS LIMITED, Palmerston North (NZ)

( * ) Notice: Subject to any disclaimer, the term of this patent is extended or adjusted under 35 U.S.C. 154(b) by 0 days.

(21) Appl. No.: 17/473,583

(22) Filed: Sep. 13, 2021

(65) Prior Publication Data

US 2021/0409855 A1    Dec. 30, 2021

Related U.S. Application Data

(63) Continuation-in-part of application No. 16/494,490, filed as application No. PCT/NZ2018/050034 on Mar. 19, 2018, now Pat. No. 11,159,874.

(30) Foreign Application Priority Data

Mar. 20, 2017    (NZ) ........................... 730305

(51) Int. Cl.
*H04R 1/10*    (2006.01)
*G01D 5/14*    (2006.01)

(52) U.S. Cl.
CPC ............. *H04R 1/105* (2013.01); *G01D 5/142* (2013.01); *H04R 1/1016* (2013.01); *H04R 1/1041* (2013.01)

(58) Field of Classification Search
CPC .... H04R 1/105; H04R 1/1016; H04R 1/1041; G01D 5/142

USPC .......................................... 381/74, 312, 322
See application file for complete search history.

(56) References Cited

U.S. PATENT DOCUMENTS

| | | | |
|---|---|---|---|
| 4,827,524 A | 5/1989 | Rising | |
| 8,098,865 B2 | 1/2012 | Ho et al. | |
| 9,510,115 B2 | 11/2016 | Bern | |
| 9,609,420 B2 | 3/2017 | Azmi et al. | |

(Continued)

FOREIGN PATENT DOCUMENTS

| | | |
|---|---|---|
| CN | 205320237 U | 6/2016 |
| CN | 106488355 A | 3/2017 |

OTHER PUBLICATIONS

First Examination Report received in Chinese Patent Application No. 2018800199168 dated Dec. 16, 2020.

(Continued)

*Primary Examiner* — William A Jerez Lora
(74) *Attorney, Agent, or Firm* — Burns & Levinson, LLP; Joseph M. Maraia

(57) ABSTRACT

A wearable device for attachment to the ear of a user can comprise an earpiece including a speaker and a body section including a hook for attachment about the ear of a user. The length of the earpiece can be adjusted. The earpiece can rotate relative to the body section. The point of rotation can be located within a region defined by the perimeter of the concha of the ear of a user. The wearable device can comprise magnetic elements configured to magnetically couple through the user's ear to retain the wearable device in place. A magnetometer which is configured and arranged to detect a degree of magnetic coupling between the magnetic elements is disclosed.

19 Claims, 26 Drawing Sheets

(56) References Cited

U.S. PATENT DOCUMENTS

| | | | |
|---|---|---|---|
| 9,723,396 B2 | 8/2017 | Qian et al. | |
| 10,856,068 B2 | 12/2020 | Qian et al. | |
| 2005/0025329 A1* | 2/2005 | Lee | H04R 1/105 |
| | | | 381/370 |
| 2011/0019850 A1* | 1/2011 | Ooi | H04R 25/60 |
| | | | 381/330 |
| 2011/0170703 A1* | 7/2011 | Palma | H04R 1/1041 |
| | | | 381/74 |
| 2012/0052924 A1* | 3/2012 | Cybart | H04R 1/1066 |
| | | | 455/569.1 |
| 2013/0322646 A1* | 12/2013 | Davie | H04R 1/1041 |
| | | | 381/74 |
| 2014/0251023 A1 | 9/2014 | Magomedov | |
| 2016/0381448 A1* | 12/2016 | Qian | H04R 1/105 |
| | | | 381/74 |

OTHER PUBLICATIONS

Extended European Search Report received in European Patent Application No. 18770230.3 dated Dec. 4, 2020.

* cited by examiner

WEARABLE DEVICE

CROSS-REFERENCE TO RELATED APPLICATIONS

This application is a continuation-in-part of co-pending U.S. application Ser. No. 16/494,490, filed Sep. 16, 2019, entitled A WEARABLE DEVICE, which is the U.S. national stage application under 35 U.S.C. 371 of International Application No. PCT/NZ2018/050034, filed Mar. 19, 2018, which in turn claims priority to New Zealand Application No. 730305, filed Mar. 20, 2017. This application also claims priority to New Zealand Application No. 777660, filed Jun. 30, 2021. The contents of the above-listed applications are incorporated herein by reference in their entirety for all purposes.

FIELD

This invention relates to a wearable device, particularly to a wearable device which is worn about a user's ear for playing audible media such as music.

BACKGROUND

Audio media playing devices that are worn about the ear of a user are known. These wearable devices typically include a speaker that is overlaid on or sits within the user's ear to play audio. Whilst most ears share common features, the size and shape of ears can vary across users, and these variations can affect the fit and comfort of the wearable device. Many wearable devices cannot be adjusted to accommodate for different ears of different shapes and sizes.

Some wearable devices can attach to an ear by coupling through the ear using complimentary magnetic elements. Although these may be comfortable and secure when used with most ears, natural variations in the size and/or shape of ears make it possible for the magnetic elements to couple too tightly or too loosely to a given user's ear. Furthermore, it is possible for a user to incorrectly couple the magnetic elements at an incorrect location or proximity so that the wearable device is too tight or too loose.

SUMMARY

According to one example there is provided a wearable device for attachment to an ear of a user, the wearable device comprising: an earpiece including a speaker; and a body section including a hook for attachment about the ear of a user; wherein the earpiece is configured so that a length of the earpiece can be adjusted; and wherein the earpiece and body section are configured so that the earpiece can rotate relative to the body section.

According to another example there is provided a wearable device for attachment to an ear of a user, the wearable device comprising: an earpiece including a speaker; and a body section including a hook for attachment about the ear of a user; wherein the earpiece and body section are configured so that when the body section is attached to the ear of a user the earpiece can rotate relative to the body section about a point of rotation located within a region defined by the perimeter of the ear of a user.

The earpiece can further include a first magnetic element, the body section can further include a second magnetic element, and the earpiece and body section can be configured so that when the body section is hooked about the ear, the first magnetic element and second magnetic element are adapted to magnetically couple through the ear to retain the wearable device in place.

The second magnetic element can be positioned so as to be proximate the concha of the ear when the body section is attached to the ear of the user.

The first magnetic element can be located at a distal end of the earpiece.

The first magnetic element can comprise a plurality of magnetic sub-elements spaced at intervals such that the first magnetic element and second magnetic element can be magnetically coupled through the ear at a plurality of positions.

The earpiece can be configured so that when the body section is attached to the ear of the user, the earpiece can rotate relative to the body section about a point of rotation located within a region defined by the perimeter of the concha of the ear.

The earpiece can comprise a first portion defining a plurality of apertures; and a second portion including a plurality of protrusions: wherein the first portion and second portion are configured such that the apertures and protrusions can releasably couple so that a length of the earpiece can be adjusted.

The earpiece can comprise a first portion; and a second portion; wherein the first portion and second portion are configured such that the first portion can telescopically extend or retract with respect to the second portion so that a length of the earpiece can be adjusted.

The earpiece can comprise a first portion including a male thread; and a second portion including a complementary female thread configured to engage with the male thread; wherein the first portion and second portion are configured such that the engagement between the male thread and complimentary female thread can be adjusted so that a length of the earpiece can be adjusted.

The earpiece can comprise a first portion; a second portion; and a resilient member configured to bias the first portion and second portion; wherein the resilient member can allow relative longitudinal movement between the first portion and second portion so that a length of the earpiece can be adjusted.

The earpiece can comprise a first portion; a second portion; and a bellows connecting the first portion and second portion; wherein the bellows is extendible and retractable so that a length of the earpiece can be adjusted.

The wearable device can include a connector and the earpiece can be configured to rotate relative to the body section about a rotatable connection to the connector.

The earpiece can include a magnetic element configured to allow rotation of the earpiece relative to the body section.

The magnetic element can be the first magnetic element.

The magnetic element can comprise an axially magnetised magnet.

The magnetic element can be rotationally symmetric.

The earpiece can be configured to be continuously rotatable in relation to the body section.

The earpiece can be configured to rotate between a plurality of discrete angular positions relative to the body section.

The magnetic element can comprise a plurality of magnetic sub-elements substantially arranged in a ring.

The magnetic sub-elements can alternate in polarity.

According to a further example there is provided a wearable device for attachment to an ear of a user, the wearable device comprising: an earpiece including a speaker and a first magnetic element a body section including a hook for attachment about the ear of a user and a second magnetic element; and a magnetometer configured to measure a magnitude of a magnetic field; wherein the earpiece and body section are configured so that when the body section is hooked about the ear, the first magnetic element and second magnetic element are adapted to magnetically couple through the ear to retain the device in place; and wherein the magnetometer is configured and arranged to detect a degree of magnetic coupling between the first magnetic element and the second magnetic element.

The detected degree of magnetic coupling can be at least partially indicative of under-coupling between the earpiece and body section when the detected degree of magnetic coupling is below a first threshold.

The detected degree of magnetic coupling can be at least partially indicative of adequate coupling between the earpiece and body section when the detected degree of magnetic coupling is equal to or above a first threshold and below a second threshold.

The detected degree of magnetic coupling can be at least partially indicative of over-coupling between the earpiece and body section when the detected degree of magnetic coupling is equal to or above a second threshold.

The detected degree of magnetic coupling can be at least partially indicative of a storage state when the detected degree of magnetic coupling is equal to or above a third threshold.

The wearable device can be configured such that the value(s) of at least one threshold are user-configurable.

The wearable device can be configured to determine the value(s) of at least one threshold based on user feedback.

The wearable device can be configured to provide feedback to the user based at least partially on the detected degree of magnetic coupling.

The feedback can indicate that the earpiece and body section are under-coupled.

The feedback can indicate that the earpiece and body section are adequately coupled.

The feedback can indicate that the earpiece and body section are in a storage state.

The feedback can include an audible component.

The feedback can include a visible component.

The feedback can include a haptic component.

The wearable device can be configured to adjust the coupling between the earpiece and body section in response to the detected degree of magnetic coupling.

The first magnetic element and/or second magnetic element can comprise an electromagnet, and adjusting the coupling between the earpiece and body section can comprise adjusting a current of the electromagnet.

Adjusting the coupling between the earpiece and body section can comprise adjusting the position of the first magnetic element and/or second magnetic element.

The wearable device can be configured to enter a device mode at least partially based on the detected degree of magnetic coupling.

The wearable device can be configured to enter a sleep mode when the detected degree of magnetic coupling indicates that the earpiece and body section are in a storage state.

The wearable device can be configured to enter a wake mode when the detected degree of magnetic coupling indicates that the earpiece and body section are no longer in a storage state.

The magnetometer can be a Hall effect sensor.

The earpiece can include the magnetometer.

The body section can include the magnetometer.

The earpiece and/or body section can include a processor.

The processor can include a media player.

The earpiece and/or body section can include a wireless communication unit.

The wireless communication unit can be configured to communicate with a cellular communication system.

The wireless communication unit can be configured to communicate with a global positioning system.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate examples of the invention and, together with the general description of the invention given above, and the detailed description of examples given below, serve to explain the principles of the invention, in which.

DETAILED DESCRIPTION

Figure 1:
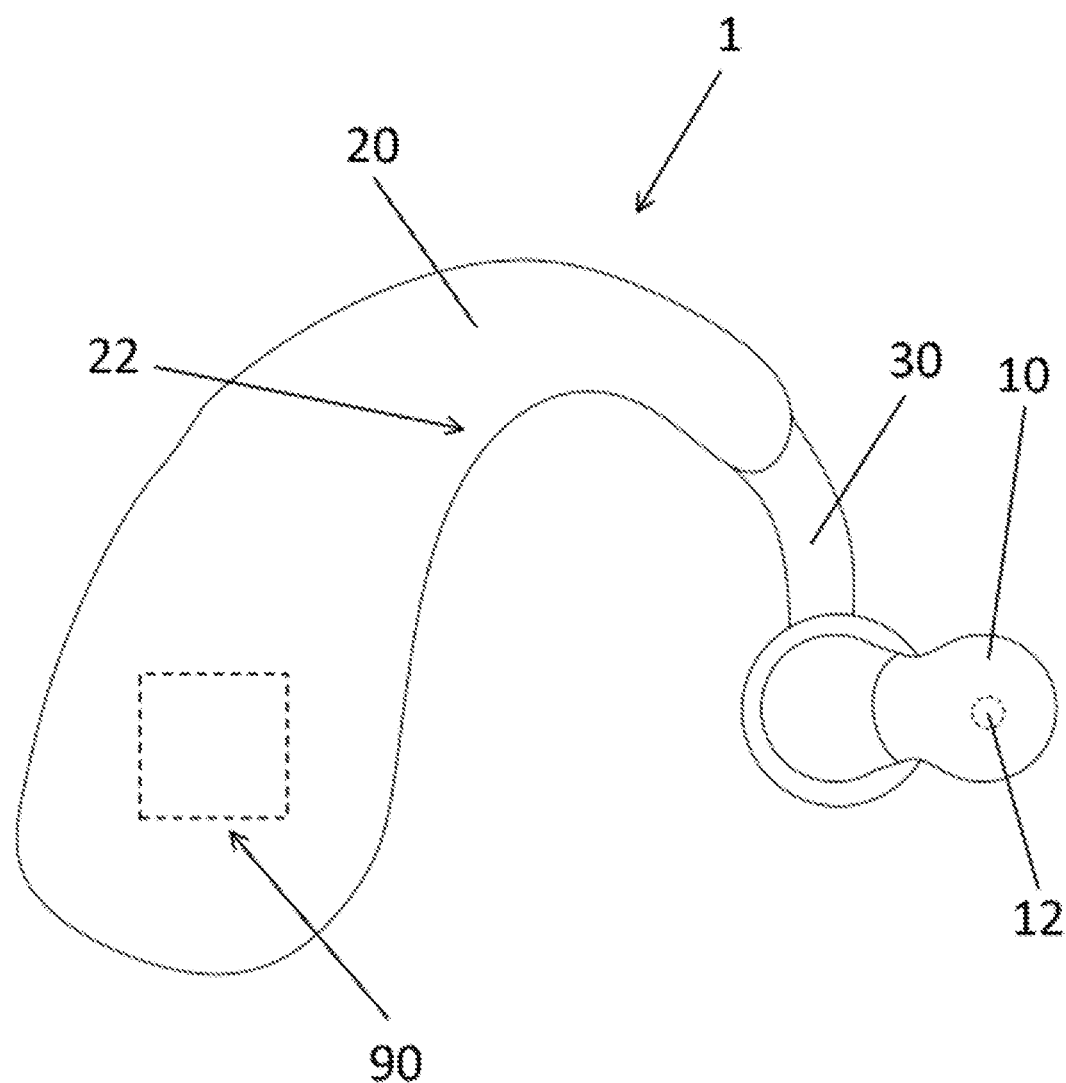
FIG. 1 is an example of a wearable device.

FIG. 1 depicts an example of a wearable device 1. The wearable device 1 is designed to be worn on or around the ear of a user when in use.

The wearable device 1 comprises an earpiece 10 and a body section 20. The earpiece 10 is positioned in use proximate the user's ear canal so that the earpiece 10 can play audio for the user. The earpiece 10 includes a speaker 12 for this purpose. The speaker 12 is in communication with circuitry 90 which is explained in more detail below and with reference to FIG. 14. Although FIG. 1 depicts the circuitry 90 within body section 20, this is purely schematic and is not intended to be limiting. The earpiece 10 may also be configured so that a length of the earpiece 10 can be adjusted, which is described in more detail below.

The body section 20 includes a hook 22 for attachment about the ear of a user. The hook 22 is typically configured to engage around the upper part of the region connecting the ear to the skull of a user when the hook 22 is attached about the ear. The hook 22 may be comparatively distinct from the remainder of the body section 20. Alternatively, the body section 20 may be generally formed in the shape of a hook 22.

The earpiece 10 and body section 20 may be configured so that the earpiece 10 can rotate relative to the body section 20, as described in more detail below.

In the example depicted in FIG. 1, the earpiece 10 and body section 20 are connected by a connector 30. The connector 30 may be configured to allow communication between the earpiece 10 and body section 20 through a wired connection. The connector 30 may alternatively or additionally have some rigidity and may bias the earpiece 10 towards the body section 20, thereby helping to retain the wearable device 1 to the user's ear when in use. However, in other examples, the wearable device may not include connector 30. In these examples, the earpiece 10 and body section 20 may communicate wirelessly, and the wearable device 1 may be retained to the user's ear without the use of connector 30.

Figure 2:
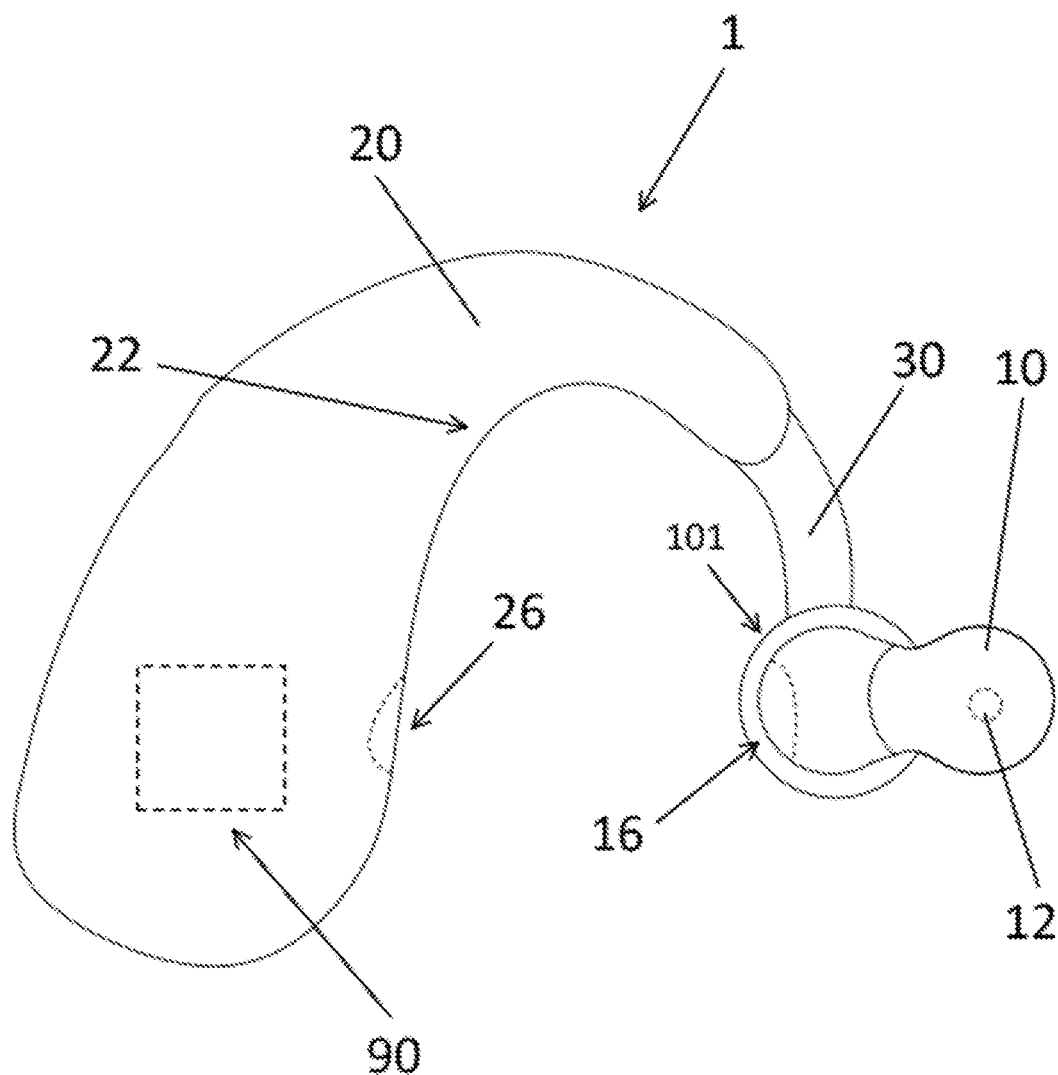
FIG. 2 is a further example of a wearable device.

FIG. 2 depicts a further example of a wearable device 1. Like reference numbers refer to the same elements as in FIG. 1.

In this example, the wearable device 1 is retained in place through magnetic forces between the earpiece 10 and body section 20. To this end, the earpiece 10 further includes a first magnetic element 16 whilst the body section 20 further includes a second magnetic element 26. The first magnetic element 16 and second magnetic element 26 can be aligned with one another so that the mutual attraction between the two secures the wearable device 1 to the user's ear. In other words, the earpiece 10 and body section 20 are configured so that when the body section 20 is hooked about the ear, the first magnetic element 16 and second magnetic 26 element are adapted to magnetically couple through the ear to retain the wearable device 1 in place.

In the example depicted in FIG. 2, the first magnetic element is located at a distal end 101 of the earpiece 10, whilst the second magnetic element 26 is positioned within the body section 20 so as to be proximate the concha of the ear of the user when the body section 20 is attached to the ear of the user.

However, either the first magnetic element 16 or second magnetic element 26 may be positioned differently in other examples. In still further examples, both of the first magnetic element 16 and second magnetic element 26 may be positioned elsewhere within or on the earpiece 10 and body section 20.

In some examples, both the first magnetic element 16 and second magnetic element 26 will comprise magnets, such as neodymium magnets. However, in some other examples, only one of the magnetic elements 16 & 26 may comprise magnets, and the other magnetic element may be a magnetic material, such as ferromagnetic steel. Materials which temporarily respond or are weakly magnetised in the presence of magnetic fields, such as annealed iron, could also be used.

Furthermore, either or both of the first magnetic element 16 and second magnetic element 26 may comprise an electromagnet in some examples. These may be particularly advantageous when a high degree of control over the magnetic field strength of the associated magnetic element is desired, even at the expense of added complexity and power consumption. In other examples where switchable or controllable magnetic elements are desirable, the first magnetic element 16 and second magnetic element 26 may comprise electropermanent magnets.

Figure 3:
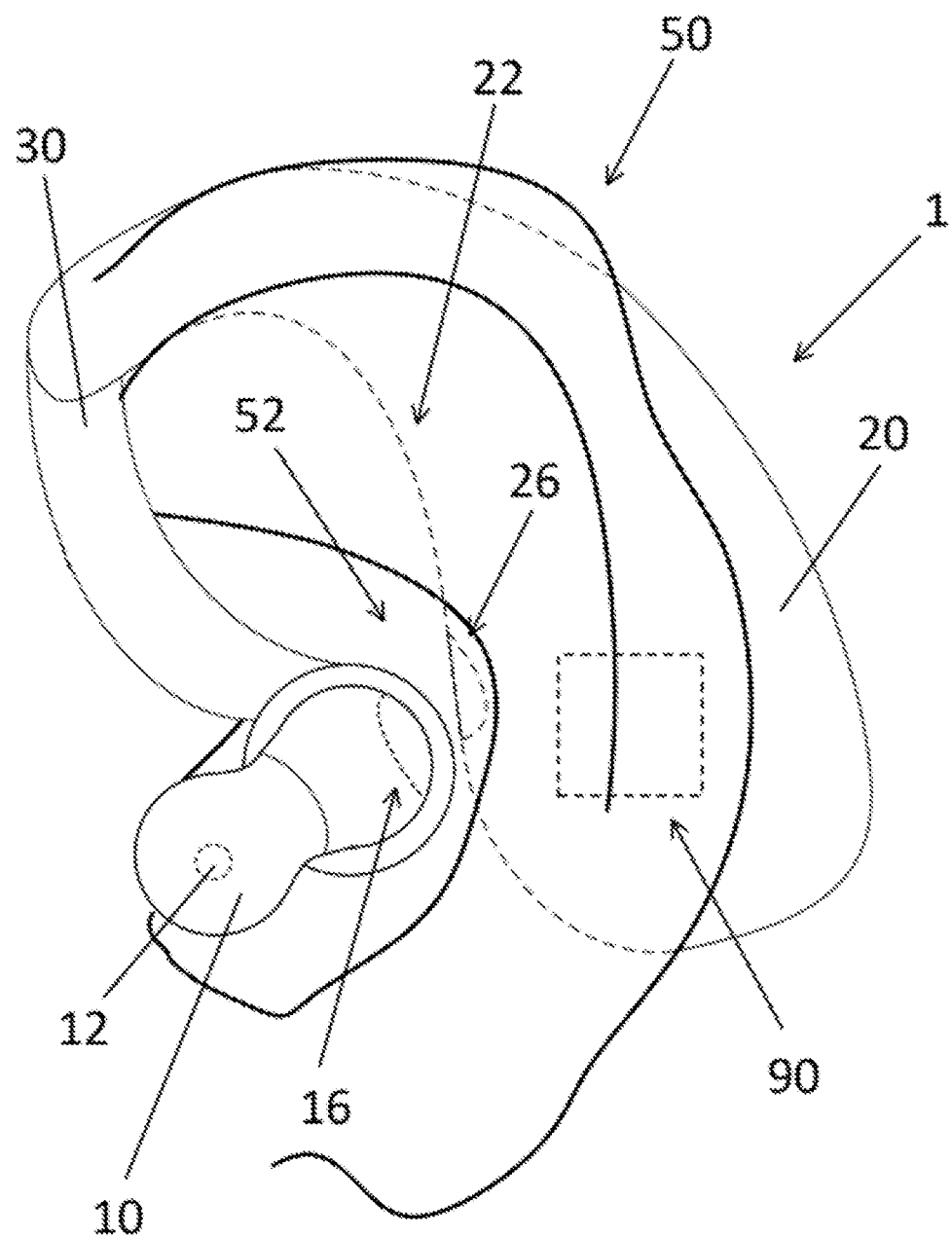
FIG. 3 is an example of a wearable device worn on a user's ear.

FIG. 3 depicts the wearable device 1 of FIG. 2 worn on the ear 50 of the user. The body section 20 is positioned behind the ear 50 of the user and the hook 22 is attached about the ear 50. The portions of the body section 20 which are positioned behind the user's ear 50 from the perspective of FIG. 3 are shown in dashed lines. The earpiece 10 sits on or within the ear 50 proximate the ear canal so that audio played through speaker 12 can be heard by the user. The first magnetic element 16 and second magnetic 26 element are positioned so that they magnetically couple through the ear 50. This magnetic coupling urges the earpiece 10 and body section 20 against either side of ear 50 with enough force to retain the wearable device 1 in the desired place. The second magnetic element 26 is positioned so that it is proximate to the concha 52 of the ear 50 when the body section 20 is attached to the ear 50.

The first magnetic element 16 and second magnetic element 26 may each comprise a single element. Alternatively, either the first magnetic element 16 and/or the second magnetic 26 element may comprise a plurality of magnetic sub-elements.

Figure 4:
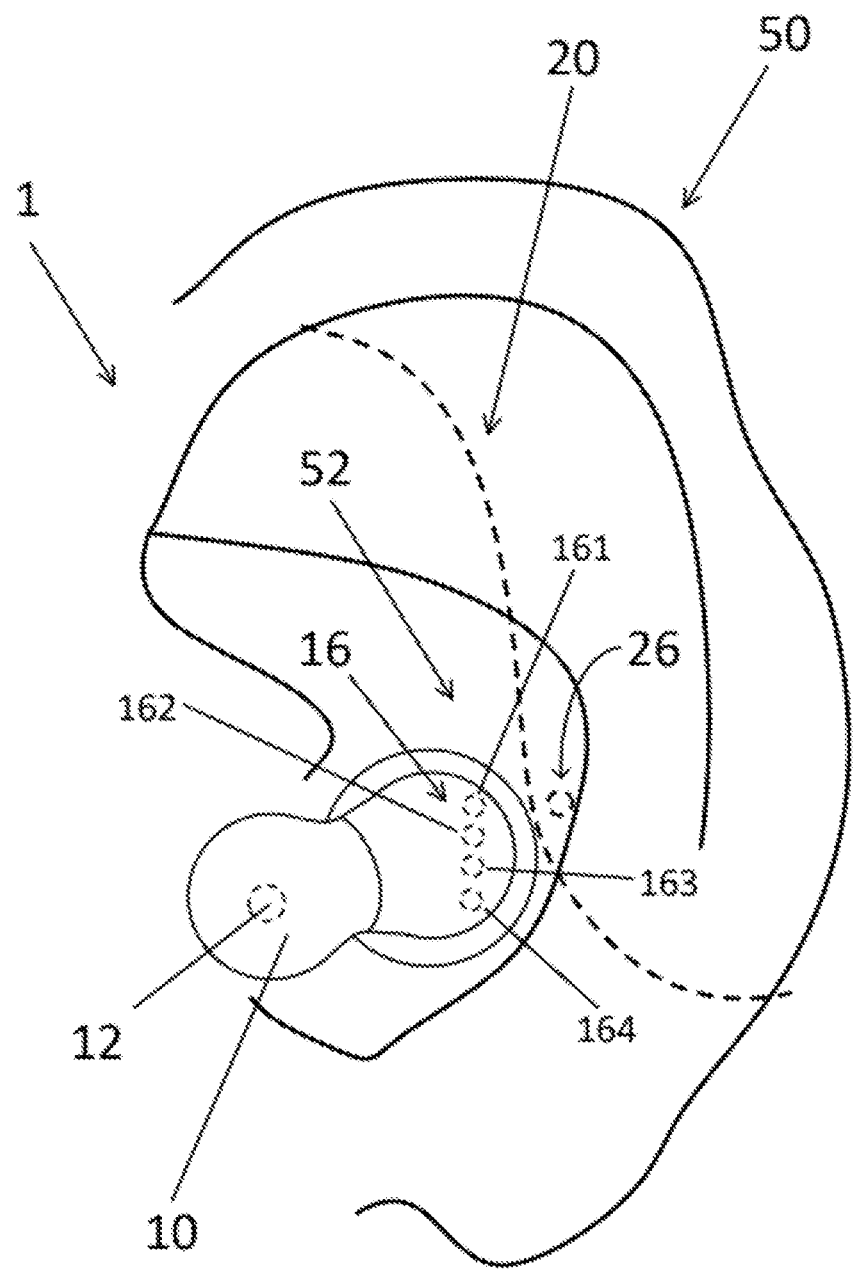
FIG. 4 is a further example of a wearable device worn on a user's ear.

One such example is depicted in FIG. 4. The body section 20 of the wearable device 1 is only shown in part for the sake of clarity. In this example, the first magnetic element 16 comprises a plurality of magnetic sub-elements 161, 162, 163, 164 which are spaced at intervals within or on the earpiece 10 while the second magnetic element 26 comprises a single element. The magnetic sub-elements 161, 162, 163, 164 of the first magnetic element 16 are spaced apart and are arranged so that second magnetic element 26 can be aligned with any one of the magnetic sub-elements 161, 162, 163, 164. This means that the first magnetic element 16 and second magnetic element 26 can be magnetically coupled through the ear 50 of the user at a plurality of different positions. The position of the earpiece 10 with respect to the body section 20 can therefore be adjusted whilst the wearable device 1 is retained in place in order to suit the ear 50 of a particular user. In the configuration depicted in FIG. 4, the first magnetic sub-element 161 is coupled to the second magnetic element 26.

Although the particular example shown in FIG. 4 includes four magnetic sub-elements 161, 162, 163, 164, other examples may have a different number of magnetic sub-elements.

Other examples of a wearable device 1 may achieve a similar result by using a second magnetic element 26 which comprises a plurality of magnetic sub-elements, whilst the first magnetic element 16 may comprise a single element. Both the first magnetic element 16 and second magnetic element 26 could also comprise a plurality of magnetic sub-elements in still further examples.

Furthermore, in the example depicted in FIG. 4, the plurality of magnetic sub-elements 161, 162, 163, 164 are spaced apart in a single line and are spaced apart in approximately even intervals. However, the magnetic sub-elements 161, 162, 163, 164 could also be spaced apart in uneven intervals and may be spaced in a different shape. For example, the magnetic sub-elements 161, 162, 163, 164 may be spaced apart in a single line that runs substantially horizontally (with respect to FIG. 4) in some examples. In other examples, a two-dimensional grid of magnetic sub-elements could be used to allow the first magnetic element 16 and second magnetic element 26 to be magnetically coupled through the ear of the user at a plurality of different positions that are spaced apart in two dimensions. In still further examples, the magnetic sub-elements could be spaced apart in a circular shape or some other shape.

In still further examples, the earpiece 10 and body section 20 may not include magnetic elements, and the wearable device 1 may be retained in place using other means. For example, the earpiece 10 and wearable device 20 may be connected by a connector which urges the two together. The wearable device 1 may then be retained in place by the biasing force effectively clipping the wearable device 1 to the user's ear 50.

In some examples of the wearable device 1, the earpiece 10 and body section 20 may be configured such that the earpiece 10 can rotate relative to the body section 20 when the wearable device 1 is worn on the ear 50 of the user.

Figure 5:
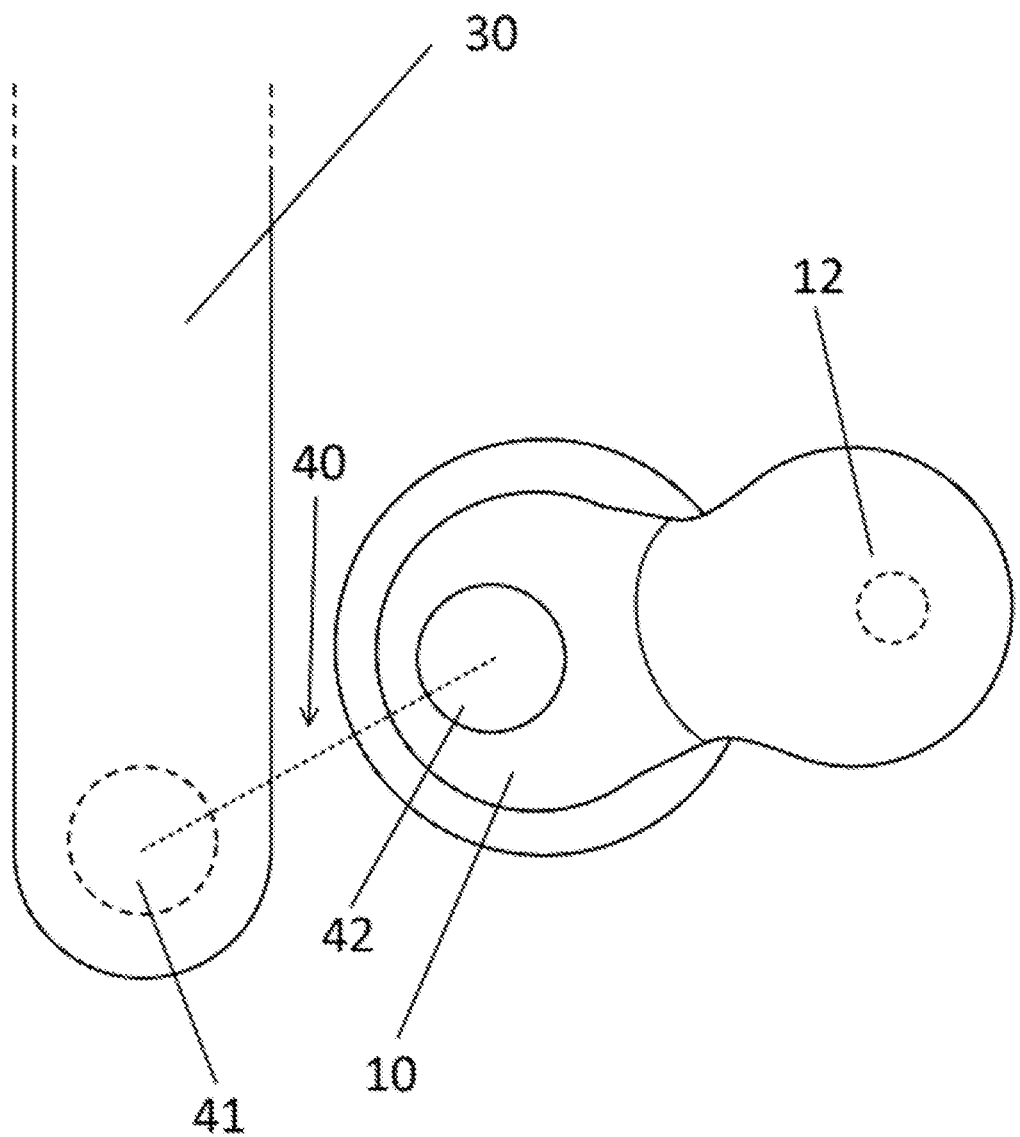
FIG. 5 is an example of a rotatable connection between an earpiece and connector.

FIG. 5 depicts an example of an exploded view of an earpiece 10 and connector 30 exploded along line 40. The earpiece 10 and connector 30 share a rotatable connection formed by connector component 41 and an earpiece component 42. The connector component 41 and/or earpiece component 42 may comprise magnetic rotation elements. The magnetic rotation elements may be axially magnetised magnetic elements. The axially magnetised magnetic elements may be rotationally symmetric about the axis of rotation of the earpiece 10 with respect to the connector 30. The connector 30 connects to the body section (not pictured in FIG. 5) which is attached to the user's ear via a hook and is substantially fixed with respect to the user's ear. The rotatable connection allows the earpiece 10 to rotate with respect to the body section of the wearable device.

The rotatable connection may allow the earpiece 10 to rotate continuously through a range of angles. For example, the rotatable connection may allow the earpiece 10 to continuously rotate through an arc of 90°. The rotatable connection could include abutting stops or other elements to limit the possible rotation of the earpiece 10 with respect to the connector 30 and body section of the wearable device.

If the connector 30 is used to communicate data or information between the earpiece 10 and body section, the rotatable connection 40 may include, for example, a slip ring so that rotation of the earpiece 10 does not interfere with the connection to the body section. Alternatively, there may be a wireless data and/or power connection between the body 20 and earpiece 10.

Figure 6:
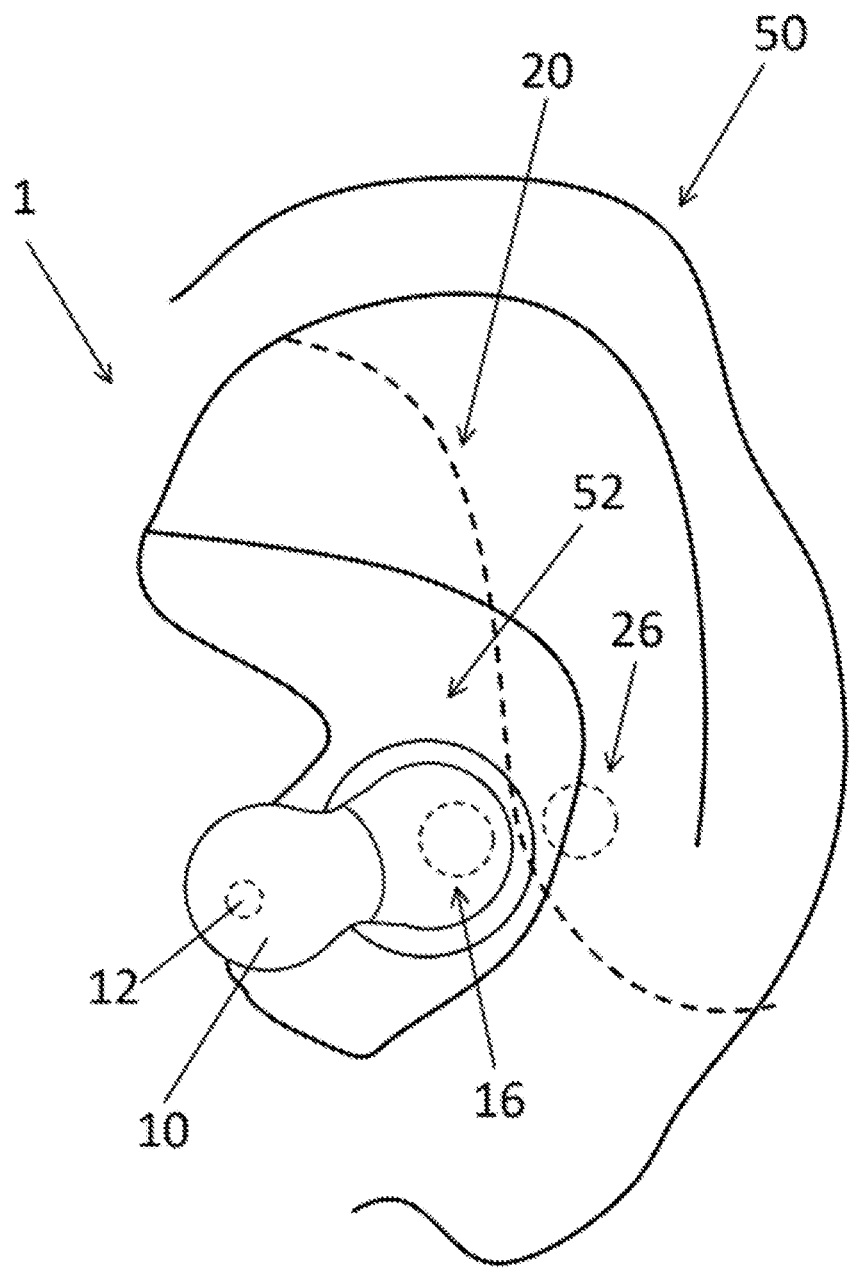
FIG. 6 is an example of a wearable device including an earpiece configured to rotate relative to a body section.

In examples of the wearable device which do not include a connector 30, rotation between the earpiece 10 and body section 20 may be achieved through a suitable configuration of the first magnetic element 16 and second magnetic element 26. One such example is shown in FIG. 6. In this example, the first magnetic element 16 and second magnetic element 26 are axially magnetized so that when the two are magnetically coupled together to retain the wearable device in place, the direction of their respective magnetic fields are rotationally symmetric about their axis of coupling. Furthermore, the first magnetic element 16 is cylindrical or disc-shaped so that its top face is circular when viewed along the axis of coupling. This means that the magnetic flux which passes through the second magnetic element 26 does not substantially vary as the first magnetic element 16 is rotated about its axis of coupling. The first magnetic element 16 can then rotate about the axis of coupling without altering the strength of the coupling to the second magnetic element 26.

It should be noted that the term 'axis of coupling' is used above as a matter of convenience to better explain an example of the wearable device 1 and is not intended to impose any limitation on the first magnetic element 16 or second magnetic element 26. In real life, there is no single one-dimensional line along which the first magnetic element 16 and second magnetic element 26 must be precisely co-linear in order to couple together. The two magnetic elements 16 & 26 may couple together if they sufficiently overlap with one another, and this may occur along any number of axes depending on the relative sizes and strengths of the magnetic elements 16 & 26. Furthermore, the magnetic fields produced by each magnetic element 16 & 26 will have non-axial components and therefore may not be rotationally symmetric about the axis of coupling in the strictest sense.

Figure 7:
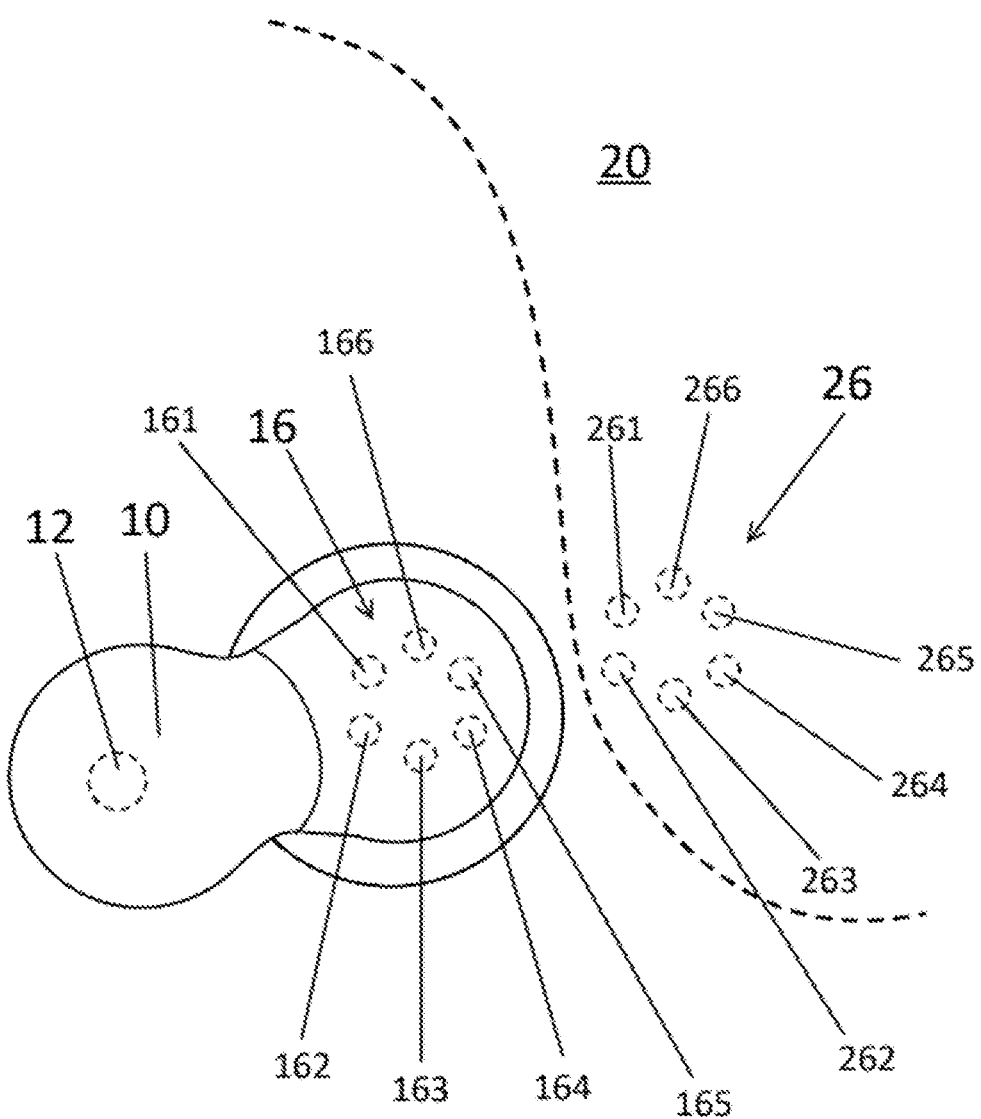
FIG. 7 is a further example of a wearable device including an earpiece configured to rotate relative to a body section.

In other examples, the earpiece 10 may be configured to rotate between a plurality of discrete angular positions relative to the body section 20 (akin to an over-centre or ratchet-like mechanism). One such example is shown in FIG. 7. The user's ear and much of the body section 20 are not depicted for the sake of clarity.

In this example, the first magnetic element 16 comprises a plurality of magnetic sub-elements 161-166 that are substantially arranged in a ring, whilst the second magnetic element 26 comprises a complementary plurality of magnetic sub-elements 261-266 that are also substantially arranged in a ring. The magnetic sub-elements 161-166 & 261-266 of each magnetic element 16 & 26 can be axially magnetised so that the first magnetic element 16 and second magnetic element 26 couple through the user's ear when the respective sub-elements 161-166 & 261-266 of each magnetic element 16 & 26 are aligned. If the earpiece 10 is rotated, the magnetic sub-elements 161-166 & 261-266 are brought out of alignment with each other and the coupling between the earpiece 10 and body section 20 lessens. If the earpiece 10 continues to be rotated, the magnetic sub-elements 161-166 & 261-266 are brought back into alignment and the coupling between the earpiece 10 and body section 20 increases.

In these examples, the number of angular positions between which the earpiece 10 may rotate is dictated by the number of magnetic sub-elements within each magnetic element 16 & 26.

Figure 8:
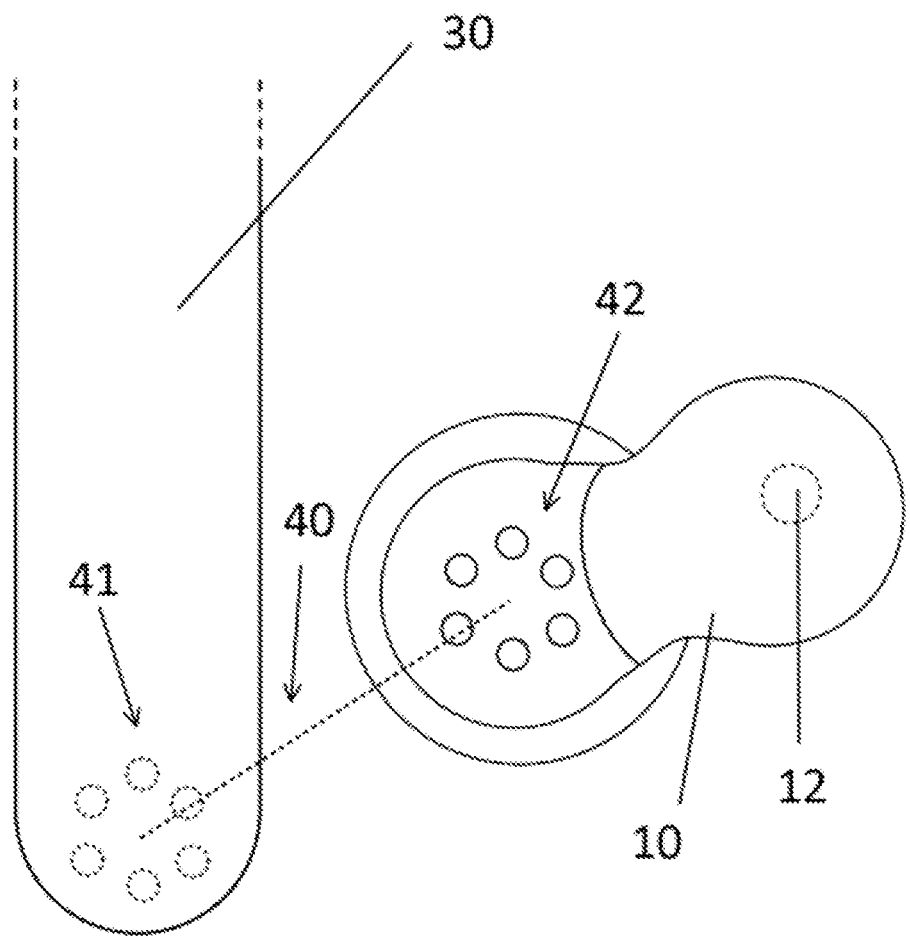
FIG. 8 is a further example of a rotatable connection between an earpiece and a connector.

A similar arrangement of complimentary magnets could also be used to create a rotational connection in an example of the wearable device that includes a connector. One such example is shown in FIG. 8. In this example, the rotatable connection includes a connector component 41 and earpiece component 42 which comprise a plurality of magnetic sub-elements which are complimentarily arranged substantially in a ring and function in substantially the same way as the magnetic sub-elements 161-166 & 261-266 of FIG. 7 as described above. In this example, the wearable device includes a connector 30 and the earpiece may or may not include a first magnetic element.

Figure 9:
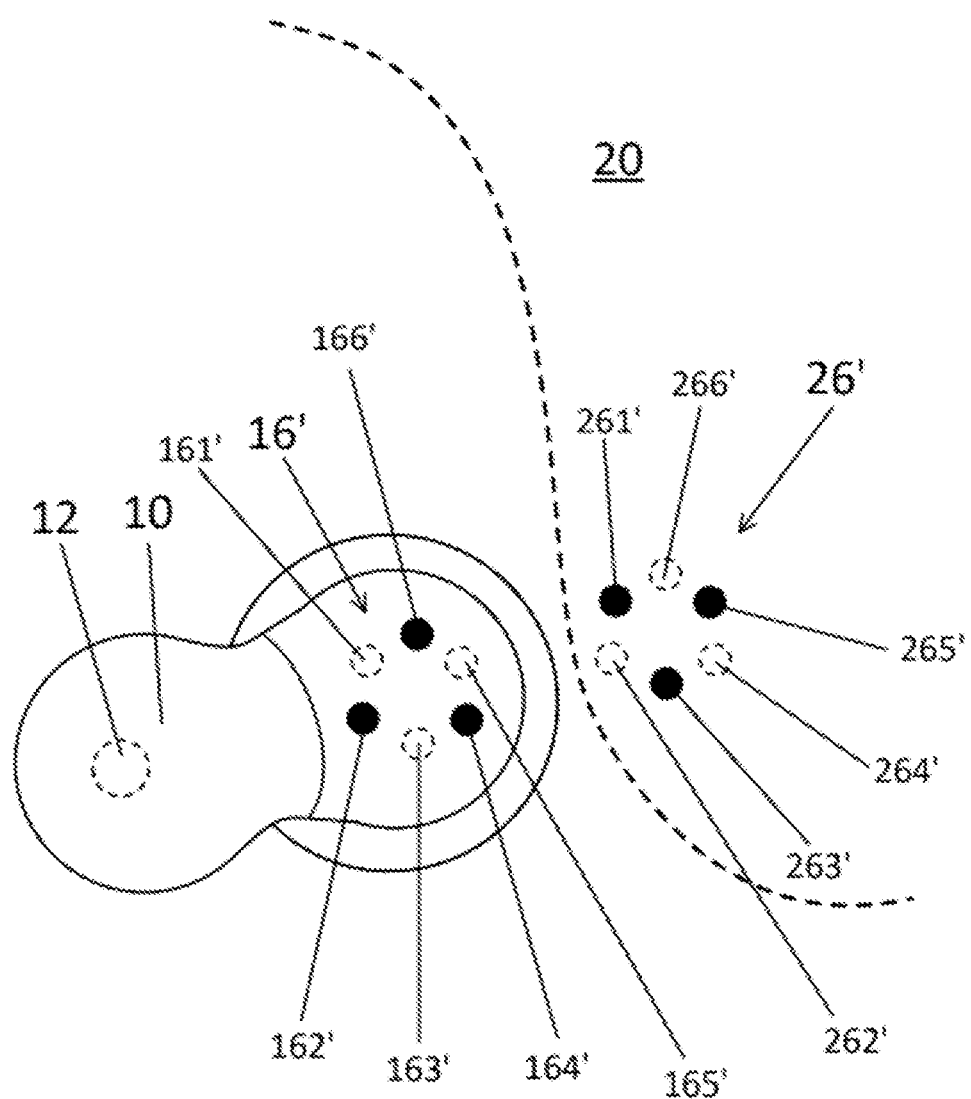
FIG. 9 is a further example of a wearable device including an earpiece configured to rotate relative to a body section.

FIG. 9 depicts a variation of the example depicted in FIG. 7. In this example, each magnetic element 16' & 26' comprises a plurality of axially magnetised magnetic sub-elements 161'-166' & 261'-266' that are each substantially arranged in a ring and alternate in their magnetic polarity (indicated by alternating black and white colouring.) This example of the wearable device functions in much the same way as the wearable device depicted in FIG. 7, except that rotating the earpiece 10 to bring complimentary magnetic sub-elements 161'-166' & 261'-266' out of alignment causes conflicting magnetic sub-elements (i.e. having the same polarity) into alignment. This may ensure that the earpiece 10 is urged or biased into a stable position at one of the plurality of discrete angular positions.

This arrangement of magnetic sub-elements 161'-166' & 261'-266' could also be integrated into a rotatable connection between a connector and earpiece in a similar way to the rotatable connection of FIG. 8.

It will be understood that in real life, the aforementioned plurality of angular positions are not 'discrete' in the strictest sense and are not restricted to single angular values defined with absolute precision. There may be some amount of play on either side of each 'discrete' angular position that the earpiece 10 may adopt with respect to the body section 20, and the earpiece 10 may be able to be continuously rotated within this permissible amount of play. The amount of play will depend on the example of the wearable device 1. However, play within a few degrees is envisaged here.

In other examples of the wearable device 1, the magnetic rotation elements and/or the first magnetic element 16 & second magnetic element 26 may comprise magnetic elements or magnetic sub-elements which are not axially magnetised. For example, the magnetic rotation elements or magnetic elements may be arranged in a Halbach array if a low stray field is desired.

In examples of the wearable device 1 which include a connector 30, rotation of the earpiece 10 with respect to the body section 20 may be achieved by a non-magnetic rotatable connection between the two. For example, the rotatable connection may include a bearing at the point where the earpiece 10 is connected to the connector 30 in order to allow continuous rotation of the earpiece 10 with respect to the body section 20 over some range of angles. The bearing may have a friction fit with its respective journal (using e.g. a rubber gasket) so that the earpiece is freely rotatable when force is applied, but has sufficient stiction to remain a given angle once it has been rotated. The rotatable connection could alternatively include a ratchet and pawl to allow the earpiece 10 to rotate between a plurality of discrete angular positions relative to the body section 20. The rotatable connection could include a screw-style rotation mechanism.

In some examples, the earpiece 10 may be configured so that it is rotatable relative to the body section 20 about a point of rotation located within a region defined by the perimeter of the concha of the ear 50 of the user. The point of rotation may additionally or alternatively be located substantially within the user's ear 50 when the wearable device 1 is worn on the user's ear 50.

For example, the point of rotation may be located substantially within the concha of the user's ear when the wearable device is worn, and the point of rotation may be lower than the anti-helix, tragus, and/or anti tragus of the user's ear. Configuring the earpiece 10 so that its point of rotation rests within a region defined by the perimeter of the concha of the user's ear, substantially within the concha of the ear, or substantially within a different part of the user's ear may allow the earpiece to fit a greater range of different ear sizes and different ear shapes.

For example, the speaker 12 of the earpiece 10 may be located towards or at a proximal end of the earpiece 10 and may be intended to be positioned over the user's ear canal when the wearable device 1 is attached to the user's ear 50. However, natural variations in the shape and/or size of the user's ear 50 may mean that the speaker 12 does not rest in its intended position when the wearable device 1 is worn. The earpiece 10 therefore may need to be rotated with respect to the body section 20 so that when the wearable device 10 is worn, the speaker 12 rests over the user's ear canal as intended. Positioning the point of rotation so that it is located within a region defined by the perimeter of the concha of the user's ear 50 may allow the earpiece 10 to be rotated over a greater range of angles and may enable the earpiece 10 to fit a wider range of ear sizes and ear shapes.

The earpiece 10 may also be configured so that a length of the earpiece 10 may be adjusted. Being able to adjust a length of the earpiece 10 may allow the earpiece 10 to fit a wider range of ear sizes and ear shapes.

Figure 10:
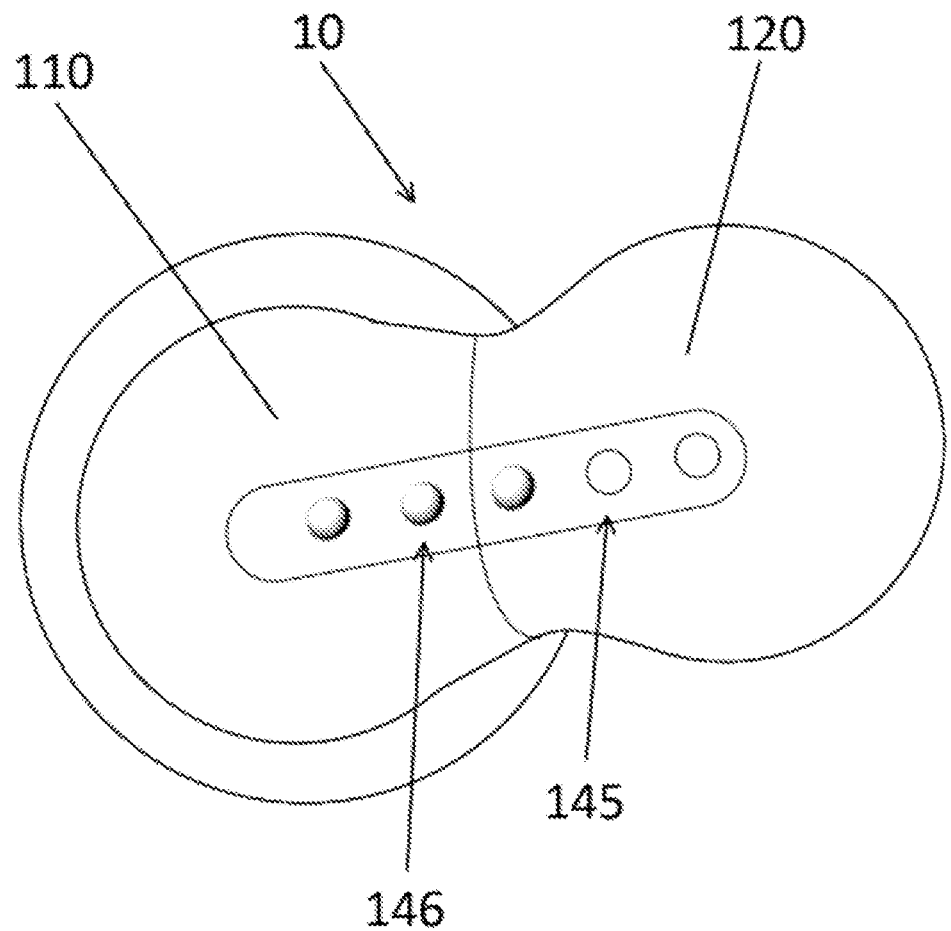
FIG. 10 is an example of an earpiece with an adjustable length.

One example earpiece 10 with an adjustable length is depicted in FIG. 10. In this example, earpiece 10 comprises a first portion 110 and a second portion 120. The second portion 120 of the earpiece defines a plurality of apertures 145, whilst the first portion 110 of the earpiece comprises at least one protrusion 146. The apertures 145 and at least one protrusion 146 are complimentary and can releasably couple to one another so that a length of the earpiece 10 can be adjusted. The protrusion or protrusions 146 may have a rounded end so that the first portion 110 of the earpiece can slide over the second portion 120 of the earpiece to adjust a length of the earpiece until the protrusions 146 align with new apertures 145. In other examples, the second portion 120 of the earpiece 10 may comprise protrusion(s) 146, whilst the first portion 110 of the earpiece 10 may defines apertures 145.

Figure 11:
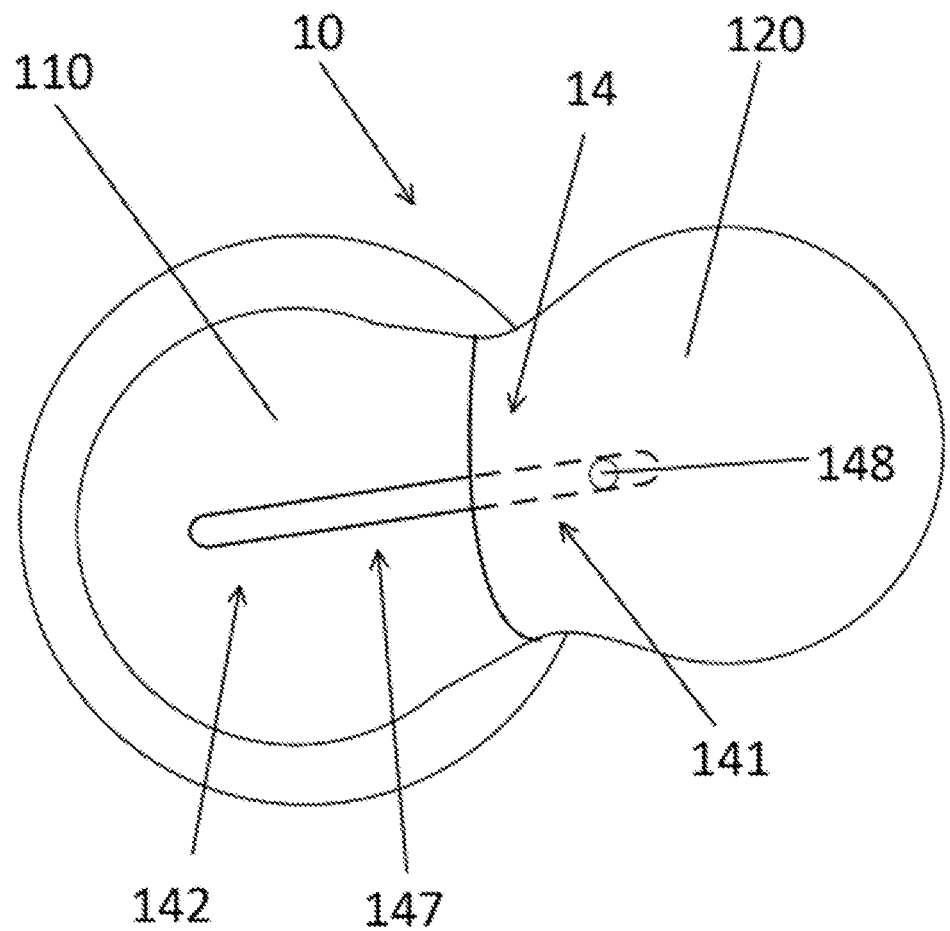
FIG. 11 is a further example of an earpiece with an adjustable length.

An additional example of an earpiece 10 with an adjustable length is depicted in FIG. 11. In this example, the earpiece 10 comprises a first portion 110 and a second portion 120. The first portion 110 and second portion 120 are configured such that the earpiece 10 can telescopically extend or retract so that a length of the earpiece 10 can be adjusted. For example, the first portion 110 may define a race or groove 147 for a complimentary slider (such as a sliding block or ball bearing 148) of the second portion 120. The complimentary slider (e.g. ball bearing 148) may then slide forwards or backwards within the race or groove 147 so that the earpiece 10 can telescopically extend or retract. An appropriate locking mechanism may be included to lock the earpiece 10 at a particular length.

In an alternative example, the earpiece may include a first portion that comprises a male thread and a second portion that comprises a complementary female thread which is configured to engage with the male thread of the first portion. The first portion and second portion may be configured so that the engagement between the mating threads can be adjusted to vary the length of the earpiece. In other words, the overlap between the complimentary threads can be adjusted to vary the length of the earpiece. This may mean that the proximal section must rotate with respect to the distal section in order to vary a length of the earpiece.

In a further example, the earpiece can include a first portion and second portion that can move longitudinally relative to one another. The first portion and second portion can be biased in generally opposite directions by a resilient member, such as a spring (e.g. a compression spring or volute spring) or a sufficiently resilient foam segment. The resilient member is compressible so as to allow relative longitudinal movement between the first portion and second portion. The user of the wearable device can compress the first portion and second portion of the earpiece together to shorten the length of the earpiece before inserting the earpiece into their ear. When the earpiece is suitably in place, it is released by the user and the extends under the biasing action of the resilient member until the first portion and/or second portion abut a portion of the user's ear.

In another example, the earpiece can include a first portion and second portion that are connected by a bellows, similar to a concertina hinge or an articulated hinge on a drinking straw. The bellows is extendible and retractable so that a user can adjust its length by pulling or pushing the first portion and second portion of the earpiece towards or away from one another. The bellows can be sufficiently rigid so that it retains its length once it has been compressed or extended into a given configuration. The user can then adjust the length of the earpiece by compressing or extending the first section with respect to the second section, thereby adjusting the length of the bellows and the earpiece as a whole.

The adjustability of the wearable device may be increased by allowing relative rotation between the earpiece and body section and including an earpiece with an adjustable length. This may mean that the wearable device is more comfortable or more compatible with a greater number of users who may have varying ear sizes and ear shapes. An increased adjustability may also reduce air leakage between the earpiece and the user's ear, thereby improving audio quality. This also means that the earpiece may not require the plastic or silicone tip that conventionally may be included to help seal gaps between the earpiece and the user's ear, potentially reducing waste and cost for the user.

Variations in the size and/or shape of the user's ear may also affect the comfort and fit of wearable devices which include magnetic elements that magnetically couple through the ear to retain the device in place. For example, a wearable device may be worn as intended but the size and/or shape of the user's ear may be such that the magnetic elements are spaced further apart than intended. The magnetic coupling between the magnetic elements may be insufficient to retain the device in place and the wearable device may be liable to become displaced during e.g. physical exercise.

Similarly, a user's ear may be sized and/or shaped such that the magnetic elements are spaced closer together than intended. The magnetic coupling between the magnetic elements may be excessive and may pinch the user's ear or otherwise cause discomfit.

A user may also incorrectly wear the device so that the magnetic elements couple through the user's ear at an unintended location. This may cause the magnetic elements to couple too strongly or couple too weakly depending on the size/shape of the ear and the position through which the elements couple.

Furthermore, users may be unsure as to whether they have correctly coupled the magnetic elements of the device so that it is secure on or about their ear. They may need to rely on sight or feel in order to gauge whether the magnetic elements have coupled properly to retain the device in place. The user may also be concerned that the wearable device may fall off as they often worn during strenuous activity or exercise. This can cause the user to intentionally restrict their exertion for fear of the magnetic coupling failing mid-activity.

Figure 12:
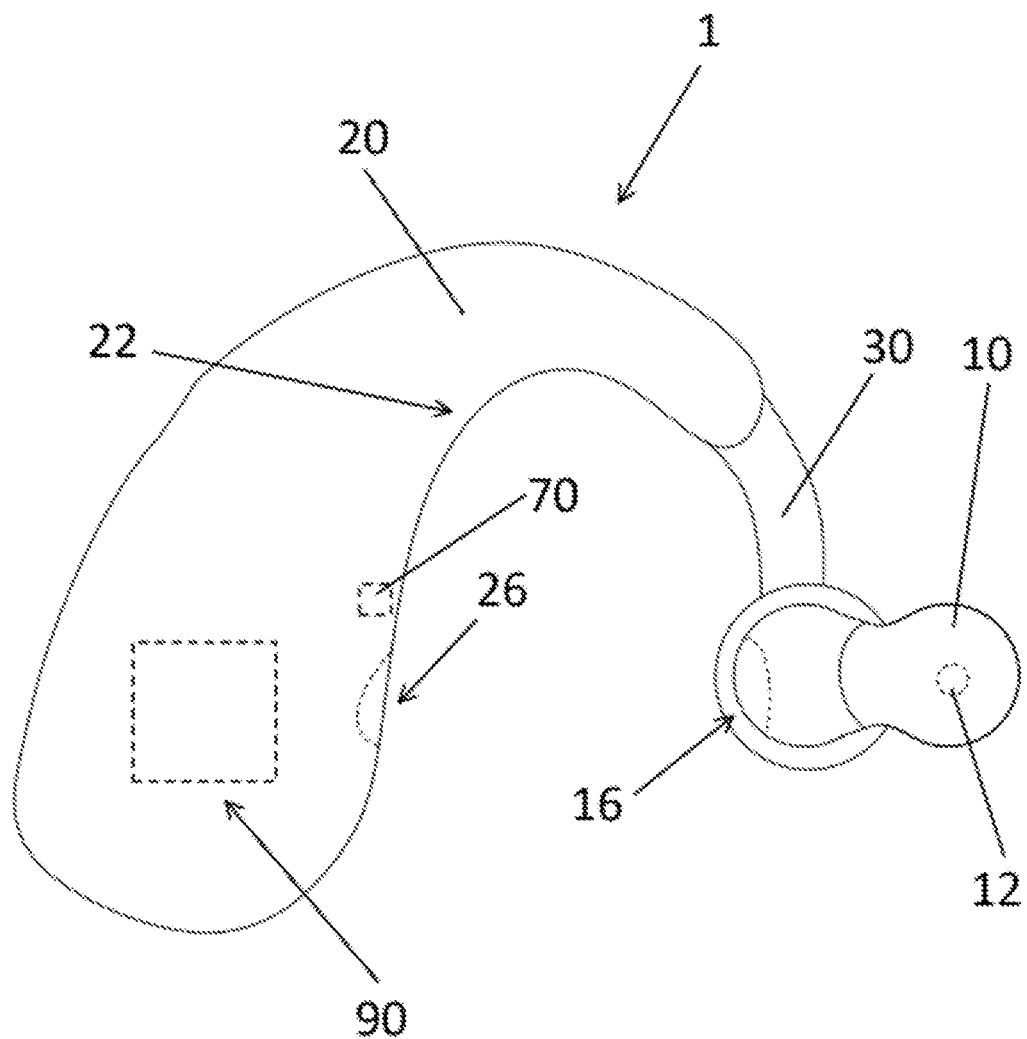
FIG. 12 is an example of a wearable device including a magnetometer.

FIG. 12 depicts an example of a wearable device 1 for attachment to an ear of a user. The wearable device 1 comprises an earpiece 10 including a speaker 12 and a first magnetic element 16, a body section 20 including a hook 22 for attachment about the ear of a user and a second magnetic element 26, and a magnetometer 70 configured to measure a magnitude of a magnetic field. The earpiece 10 and body section 20 are configured so that when the body section 20 is hooked about the ear, the first magnetic element 16 and second magnetic element 26 are adapted to magnetically couple through the ear to retain the device 1 in place.

The magnetometer 70 is configured and arranged to detect a degree of magnetic coupling between the first magnetic element 16 and second magnetic element 26.

The earpiece 10 depicted in FIG. 11 may be configured to rotate relative to the body section 20. The earpiece 10 may be configured so that a length of the earpiece 10 can be adjusted. The earpiece depicted in FIG. 11 includes a connector 30, although other examples may not include a connector 30.

The magnetometer 70 may be a Hall effect sensor, although other types of magnetometers may also be used. The magnetometer 70 may be installed within or on the body section 20 or may be installed within or on the earpiece 10. Other examples may include magnetometers 70 in both the earpiece 10 and body section 20. Further examples may include a magnetometer 70 in a component other than the earpiece or body section, such as a connector 30 (if present).

The magnetometer 70 may be configured to detect the degree of magnetic coupling between the first magnetic element 16 and second magnetic element 26 by measuring a magnitude of a magnetic field. The magnetometer 70 may alternatively or additionally be configured to detect the degree of magnetic coupling between the first magnetic element 16 and second magnetic element 26 by measuring a magnitude of a magnetic flux.

The measured magnitude of the magnetic field and/or magnetic flux may be quantified and converted into a quantitative and/or qualitative degree of magnetic coupling using a known relationship. For example, the detected degree of magnetic coupling may be quantified into a value ranging from 0 to 100, wherein each value corresponds to a quantified magnetic field magnitude and/or magnetic flux. For example, a magnetic coupling of 100 may correspond to the measured magnetic field magnitude/flux when the earpiece 10 and body section 20 are brought into contact with one another. This measurement may be performed at the factory in order to calibrate the relationship between the readings of the magnetometer 70 and the corresponding degree of magnetic coupling. Other magnetic coupling values could be calibrated by e.g. taking magnetometer 70 readings at various earpiece 10—body section 20 separation distances.

In other examples, the calibration may be performed by the user positioning the earpiece 10 with respect to the body section 20. For example, the user may be instructed to place the earpiece 10 adjacent to the body section 20 and to indicate when the two are positioned accordingly. The magnetometer 70 may then perform a measurement and may equate the measured value with maximum coupling between the two magnetic elements.

Other examples may use other relationships to calibrate or relate the magnitude and/or flux as measured by the magnetometer 70 to the detected degree of magnetic coupling. Alternatively, the detected degree of magnetic coupling may correspond to the magnitude and/or flux as measured, without any additional scaling or conversion.

The measured magnitude/flux and/or quantified degree of magnetic coupling may be compared against one or more pre-determined reference values to qualitatively describe the degree of magnetic coupling between the two elements 16 & 26. The reference values may also be user-determined or determined through use of the wearable device 1, as will be described below. The comparison between the quantified magnetic field and/or magnetic flux and reference values may be used to at least partially indicate a degree of magnetic coupling between the first magnetic element and second magnetic element in a qualitative way.

For example, the degree of magnetic coupling between the two elements may be qualitatively described by categorising the degree of magnetic coupling using one or more of the following descriptors:

Under-coupled: Weak and insufficient coupling. The first magnetic element 16 and second magnetic element 26 may be coupled to some extent, although the wearable device 1 may not be retained by the magnetic coupling and may be liable to detach from the user's ear.

Adequately coupled: Coupled to a certain degree so that the wearable device 1 is comfortably and securely retained on the user's ear.

Over-coupled: Coupled to the point where the wearable device 1 is possibly uncomfortable or is undesirably tight on the user's ear.

In a storage state: Coupled so strongly that the wearable device 1 is likely stored away (i.e. is not being worn) or is being charged. The earpiece 10 and body section 20 may be adjacent or near-adjacent if the wearable device is in a storage state.

In some examples, the wearable device 1 may not be configured to qualitatively describe the magnetic coupling using all of these categories. For example, the wearable device 1 may only be configured to indicate whether the first magnetic element 16 and second magnetic element 26 are adequately coupled or are under-coupled. In further examples, the wearable device 1 may use an entirely different schema to qualitatively describe the degree of magnetic coupling as detected by the magnetometer 70. In still further examples, the wearable device 1 may not qualitatively describe the detected degree of magnetic coupling at all, and the detected degree of magnetic coupling may be described purely quantitatively.

Figure 13:
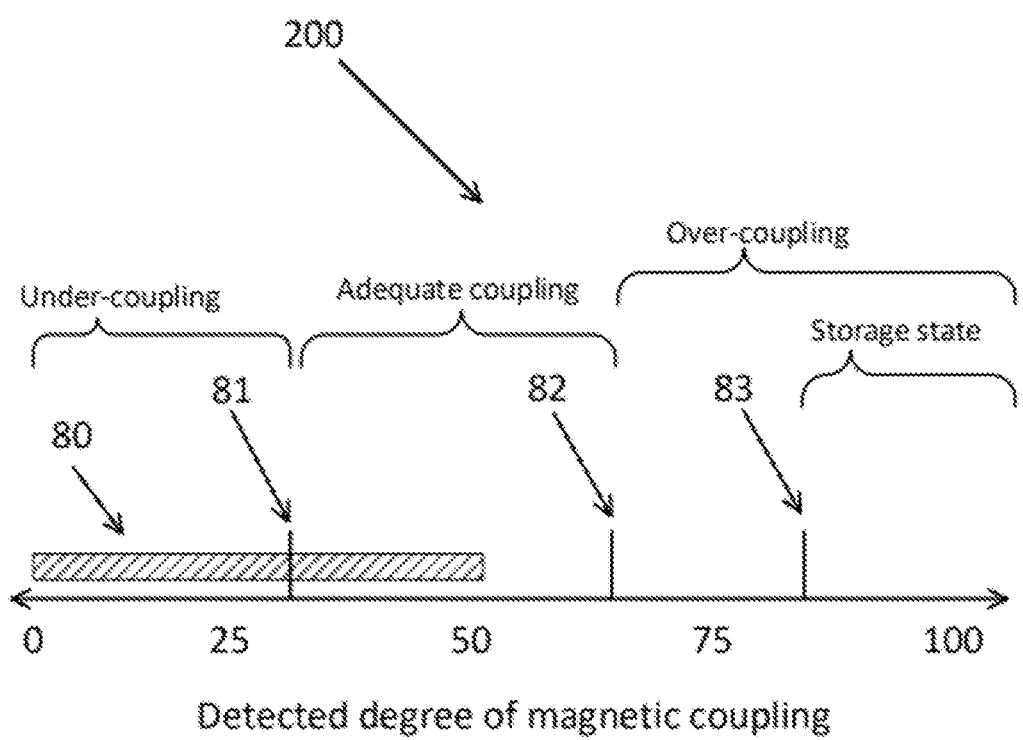
FIG. 13 is a graph showing the detected degree of magnetic coupling between an earpiece and body section of a wearable device.

FIG. 13 illustrates one example of how the detected degree of magnetic coupling may be at least partially indicative of under-coupling, adequate coupling, over-coupling, and/or storage of the earpiece and body section. In this example, the detected degree of magnetic coupling 80 has been converted into a scale between 0-100, as described above, and represented on graph 200. The detected degree of magnetic coupling is: at least partially indicative of under-coupling between the earpiece and body section if the detected degree of magnetic coupling is below a first threshold 81; at least partially indicative of adequate coupling between the earpiece and body section if the detected degree of magnetic coupling is above the first threshold 81 and below a second threshold 82; at least partially indicative of over-coupling between the earpiece and body section if the detected degree of magnetic coupling is equal to or above the second threshold 82; and at least partially indicative of a storage state when the detected degree of magnetic coupling is equal to or above a third threshold 83.

In this example, using arbitrary values, the first, second, and third thresholds 81, 82, 83 are expressed in terms of the detected degree of magnetic coupling which is scaled between 0-100. However, in other examples, the various thresholds 81-83 may be expressed in terms of the measured magnitude and/or flux as measured by the magnetometer 70 without any kind of scaling, as discussed above.

The calibration between the detected degree of magnetic coupling and the qualitative description of the coupling between the earpiece 10 and body section 20 may initially be defined by the manufacturer. In some examples, the relationship or calibration may additionally (or alternatively) be user-configurable. For example, the user may be able to manually set some or all of the values of the first threshold 81, second threshold 82, and/or third threshold 83 corresponding to each of the regimes. If fewer qualitative categories than the four discussed above are used, some or all of the corresponding thresholds 81-83 (or ranges, or whatever else is used to calibrate the detected degree of magnetic coupling with its qualitative description) may be user-configurable accordingly.

This functionality may be particularly useful to accommodate a wide variety of ear shapes and ear sizes. For instance, whilst a factory calibration of the wearable device 1 may be suitable for most users, other users may need or want to configure the calibration according to their own requirements. As one example, a user with particularly large ears may find that an adequate coupling between the earpiece 10 and body section 20 for their ear is classified as an under-coupling according to the factory calibration due to the unusually large distance between the first magnetic element 16 and second magnetic element 26. Similarly, a user with particularly small ears may find that an adequate coupling between the earpiece 10 and body section 20 for their ear is classified as an over-coupling according to the factory calibration due to the unusually small distance between the first magnetic element 16 and second magnetic element 26. Allowing the user to configure the calibration or relationship between the detected degree of magnetic coupling and the qualitative description thereof means that the user can account for the fit and comfort of the wearable device given their ear shape and size.

Additionally or alternatively, the wearable device may be configured to learn the relationship or calibration between the detected degree of coupling and qualitative description thereof based on feedback from the user. With respect to the example depicted in FIG. 13, the wearable device 1 may be configured to determine the value(s) of the first threshold 81 and/or second threshold 82 and/or third threshold 83 based on user feedback.

For example, the user may be asked to magnetically couple the earpiece 10 and body section 20 through their ear in a certain way and may be asked to provide an indication of comfort or discomfort. The indication could be qualitative (e.g. 'comfortable' vs 'uncomfortable') or may be quantitative (e.g. measured on a scale from 0-10, with 10 being comfortable and 0 being uncomfortable.) The user may input their feedback using an interface such as a button, speaking into a microphone, or any other appropriate way. This may be repeated for a number of earpiece 10/body section 20 distances and/or positions. If either of the first magnetic element 16 or second magnetic element 26 comprises an electromagnet, the strength of the electromagnet may be varied to vary the degree of coupling between the two. Alternatively, the position of a magnet may be changed, for example using a small geared motor to move a magnet relative to the body or earpiece to adjust the strength of coupling. The wearable device 1 may then correlate the detected degree of magnetic coupling with the feedback of the user in order to determine the value of the threshold(s), range(s), or whatever else is used to calibrate the detected degree of magnetic coupling with its qualitative description.

The wearable device 1 may also be configured to provide feedback to the user based at least partially on the detected degree of magnetic coupling. The feedback could be based on the quantitatively detected degree of magnetic coupling (e.g. the raw measurement of the magnetometer and/or the scaled/calibrated degree of magnetic coupling) and/or on the qualitative description of the magnetic coupling. For example, the feedback could indicate that the earpiece and body section are under-coupled, adequately coupled, over-coupled, and/or in a storage state. This feedback could help the user position, align, or otherwise adjust the wearable device on his or her ear. For example, if the feedback indicates that the earpiece 10 and body section 20 are under-coupled, the user may bring the earpiece 10 closer to the body section 20 to improve the coupling therebetween. If the feedback indicates that the earpiece 10 and body section 20 are over-coupled, the user may distance the earpiece 10 from the body section 20 to reduce the degree of coupling between the two.

The feedback may include an audible component, a visible component, and/or a haptic component. For example, the feedback could be played through the speaker 12 of the earpiece 10 and may let the user know how the earpiece 10 and body section 12 are qualitatively coupled. Haptic feedback could additionally or alternatively be provided by vibration of the earpiece 10 and/or body section 20. The earpiece 10 and/or body section 20 could include a light or LED which may blink or turn on to indicate the coupling status of the earpiece 10 and body section 20. Although the earpiece 10 and body section 20 are usually not visible to the user when the wearable device 1 is worn, this feedback may be particularly useful to indicate that the wearable device is in a storage state.

The wearable device 1 may be configured to adjust the coupling between the earpiece 10 and body section 20 in response to the detected degree of magnetic coupling as detected by the magnetometer 70. This may allow the wearable device 1 to correct for unideal coupling without user intervention. The adjustment may be made on the basis of the raw measurements of the magnetometer 70 (e.g. magnitude and/or magnetic flux), scaled measurements (as discussed above), or qualitative description or categorisation of the coupling.

For example, the first magnetic element 16 and/or second magnetic element 26 may comprise an electromagnet, and the wearable device 1 may adjust the coupling between the earpiece 10 and body section 20 by adjusting a current of the electromagnet. This may increase or decrease the strength of the magnetic field produced by the electromagnet in order to adjust the coupling between the earpiece 10 and body section 20 accordingly.

Additionally or alternatively, the wearable device 1 may be configured to adjust the coupling between the 10 earpiece and body section 20 by adjusting a position of the first magnetic element 16 and/or second magnetic element 20. For example, the first magnetic element 16 and/or second magnetic element 26 may be mounted on a movable mount that can be positioned by an actuator. The actuator may actuate to bring the magnetic elements 16 & 26 closer together or further apart to adjust the coupling between the earpiece 10 and body section 20.

The wearable device 1 may be configured to enter a device mode at least partially based on the degree of magnetic coupling between the first magnetic element 16 and second magnetic element 26 as detected by magnetometer 70. As used herein, a 'device mode' broadly refers to a way in which the device operates. For example, the wearable device 1 may be configured to enter a sleep mode when the detected degree of magnetic coupling indicates that the earpiece 10 and body section 20 are in a storage state. If the wearable device 1 is in a sleep mode, it may conserve power by e.g. reducing communications or transmissions it makes with external transceivers, minimising visual/audible/haptic feedback, and/or reducing background processes. Alternatively, the wearable device 1 may turn completely off when it is in a sleep mode. The wearable device may also power down any electromagnets if present, although the wearable device may need to account for any corresponding change to the detected degree of magnetic coupling that may ensue.

The wearable device 1 may also be configured to enter a wake mode when the detected degree of magnetic coupling indicates that the earpiece 10 and body section 20 are no longer in a storage state. For example, when the user decouples the earpiece 10 from the body section 20 so that the wearable device is no longer in storage and/or being charged, the wearable device 1 may re-initiate communications with external transceivers, may provide visual/audible/haptic feedback to the user, and/or increase background processes. The wearable device 1 may also power up any electromagnets if present, although the wearable device may need to account for any corresponding change to the detected degree of magnetic coupling that may ensue.

Figure 14:
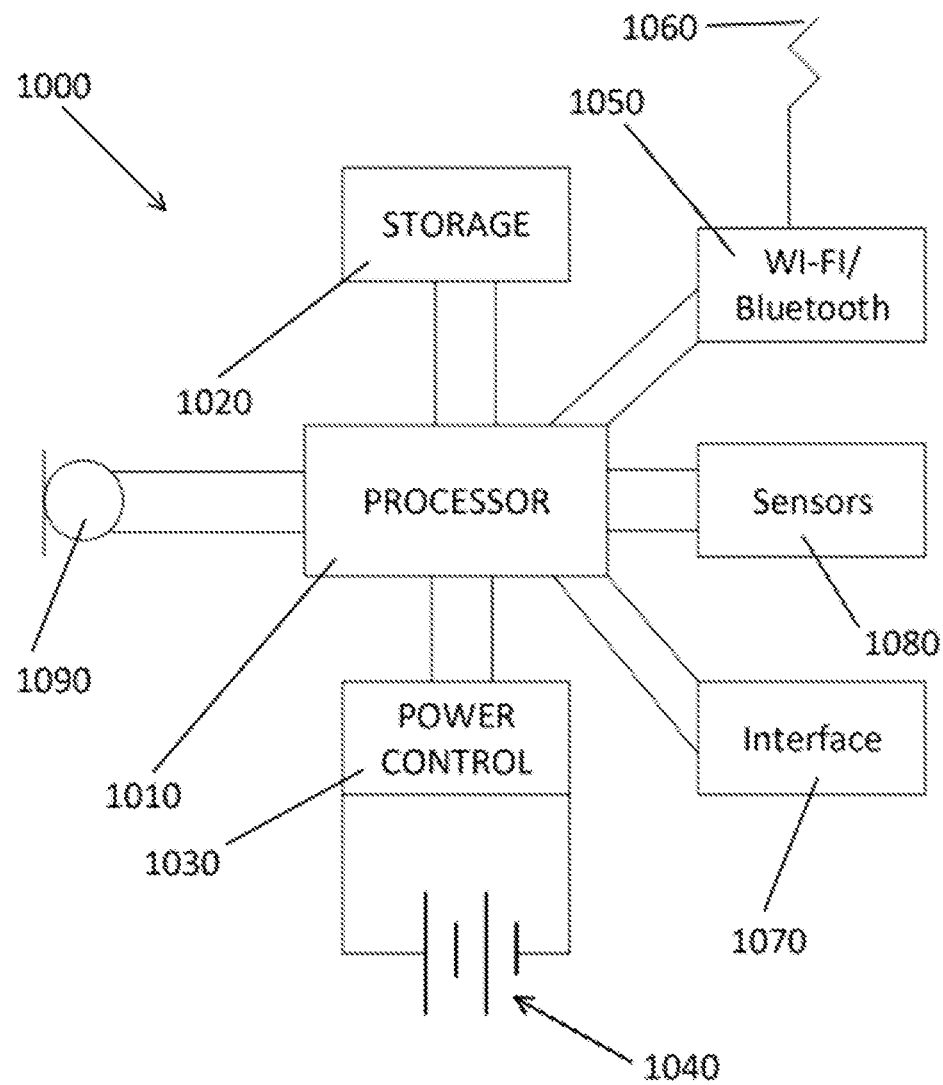
FIG. 14 is a block diagram of an example circuit which may be used with a wearable device.
Figure 15:
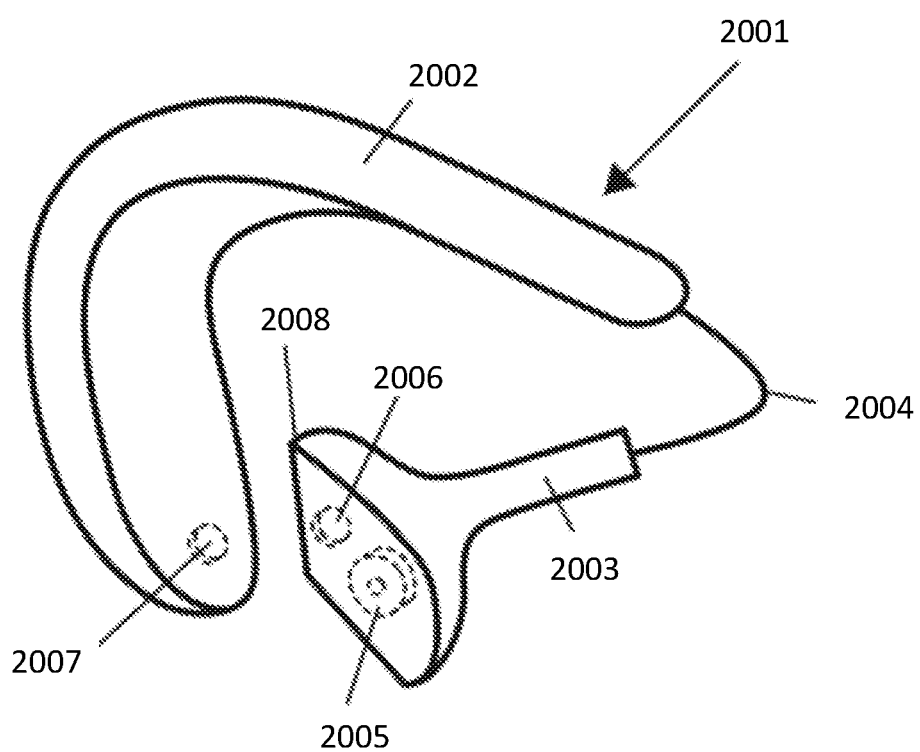
FIG. 15 shows a perspective view of a wearable device according to one embodiment.
Figure 16:
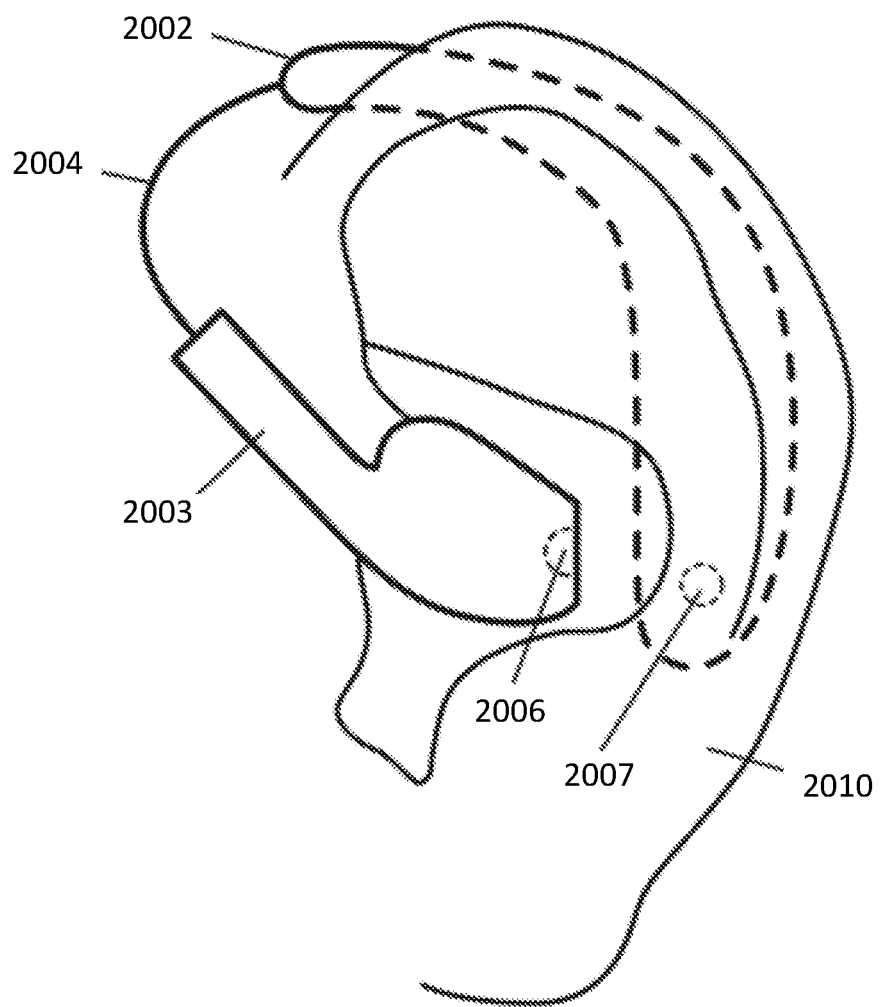
FIG. 16 shows the wearable device of FIG. 15 when worn on the ear of a user.

FIG. 14 depicts an example circuit that may be included in the wearable device 1. It will be appreciated that this circuit may be used in any of the examples described herein. Other circuits with other circuit elements may also be used.

The circuit 1000 includes a processor 1010 having associated storage 1020, typically flash RAM, and a power supply 1030 supplying power from a battery 1040. The battery is preferably rechargeable, although disposable batteries could also be used. The processor 1010 may be positioned inside the earpiece 10, body section 20, and/or an entirely separate component of the wearable device 1. The processor 1010 may include a media player used to play audio media (e.g. music) through at least the speaker 12 of the earpiece 10. The audio media may be stored in storage 1020 or may be received wirelessly. To this end, the circuit 1000 may include a wireless communication unit 1050. The wireless communication unit 1050 may enable the earpiece 10 to wirelessly communicate with the body section 20 and may also or alternatively allow the wearable device 1 to communicate with external entities using e.g. Bluetooth, Wi-Fi, or other communication protocols. The wireless communication 1050 unit may be configured to communicate with a cellular communications system and/or a global positioning system. The wireless communication unit 1050 may include an aerial 1060.

The circuit may include one or more user inputs such as buttons through interface 1070. These may be used to control the volume of the speaker 12 of the earbud 10 or otherwise control audible media. These may also be used to provide feedback to the wearable device 1 to calibrate how the detected degree of magnetic coupling is qualified, as described above.

The circuit 1000 may also include a range of sensors 1080 such as a heart rate monitor, temperature sensor, movement sensor, accelerometer, location sensor, GPS, gyroscope, altimeter, etc. A microphone 1090 may also be included.

Disclosed below are wearable devices for attachment to an ear that may be a simple earphone or which may include a media player and/or wireless communication circuit and/or a microprocessor and/or bio sensors or other sensors. For a simple wired earphone a wire may provide a signal to drive an earphone in the device. For a wireless embodiment the device will require a battery and a circuit for receiving wireless signals and driving the earphone. The circuit may include a microprocessor to receive information from sensors and to modify the operation of the device based on sensed information and wireless information received.

FIGS. 15 to 19 show a wearable device 2001 including a body section 2002 in the form of a "hook" configured to engage around the upper part of the region connecting the ear to the skull of a user. The hook may be dimensioned to surround a circle having a radius of between 20 to 32 mm, preferably 25 mm to 27 mm. The body section may have a length of between 10 mm and 100 mm and a thickness of between 0.1 mm and 20 mm. The body section 2002 may be flexible to wrap around the ear of a user and may be twisted so as to direct the weight of the body section into the skull of a user. A coating may be provided on internal faces for user comfort (otherwise the attractive force between the magnets may impose an uncomfortable force on a user's ear) formed of a thermoplastic elastomer or silicone (siloxane) of hardness range between Shore A 30 to Shore A 90, preferably about Shore A 40. Due to the strong attractive forces of the magnets the silicon may not be able to retain the magnets and the magnets may need to be physically retained by a rigid element of the body or bonded to the body.

In this embodiment an earpiece 2003 is connected to the body section via a flexible connection, in this case a cable 2004 which provides an electrical signal from the body section to drive speaker 2005. Earpiece 2003 may suitably have a length of between 13 mm and 22 mm and a width of between 10 mm and 16 mm. The cable 2004 may suitably have a length of between 10 mm and 60 mm and a width of between 0.1 mm and 8 mm.

Figure 17:
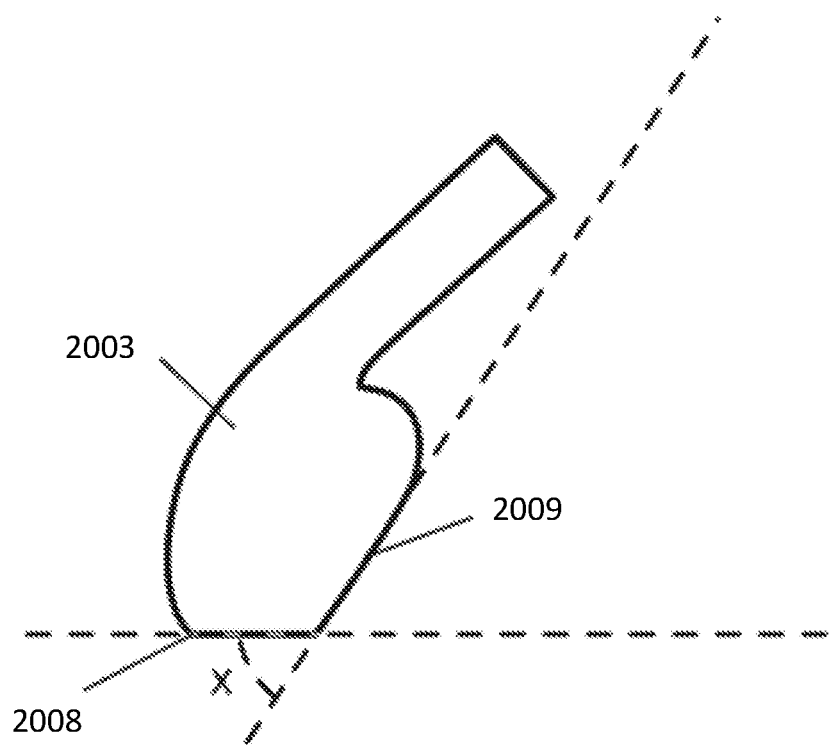
FIG. 17 shows the geometry of the earphone of the wearable device shown in FIG. 15.

As shown in FIG. 17 a distal face 2008 of earpiece 2003 is disposed at an angle x with respect to the face 2009 of the earpiece which opposes the ear canal. The angle x is preferably within the range of 30° and 60° and preferably between 50° and 55°. This angle is important to correctly dispose the earpiece with respect to the ear canal but also to apply the correct forces to the earpiece and body section so as to urge them tightly against the ear of a user so as to be secured during vigorous exercise.

The body section 2002 includes a magnetic element 2007 and the earpiece includes a magnetic element 2006. It will be appreciated that one of magnetic elements 2006 and 2007 may be a magnet and the other may simply be a magnetic material, such as a ferromagnetic steel, or both may be magnets. Small, strong neodymium magnets are preferred. In the following description both elements will simply be referred to as magnets but it will be appreciated that any elements providing suitable magnetic attraction between them may be utilized. That being said, high strength permanent magnets do produce strong magnetic attraction for small component size.

In the embodiment of FIGS. 15 to 19 a single magnet 2006 is provided on the earpiece 2003 and a single magnet 2007 is provided on the body 2002. Magnet 2006 may be a permanent magnet having a volume of between 6 mm$^3$ and 440 mm$^3$, preferably between 150 mm$^3$ and 175 mm$^3$, having a magnetic field strength of between 368 gauss and 1200 gauss. Magnet 2007 is preferably a permanent magnet having a volume of between 2 mm$^3$ and 63,000 mm$^3$, preferably between 400 mm$^3$ and 440 mm$^3$, having a magnetic field strength of between 4500 gauss and 8000 gauss (typically producing a pull of between 3 to 5 pounds). The magnets may suitably be in the form of a cylinder, rectangular block, hexagonal tube, multiple individual magnetic beads or semicylinder etc.

In this embodiment the dimensions of body section 2002 and length of flexible cable 2004 and positions of the magnets will be optimized for a range of standard ear shapes.

Figure 18:
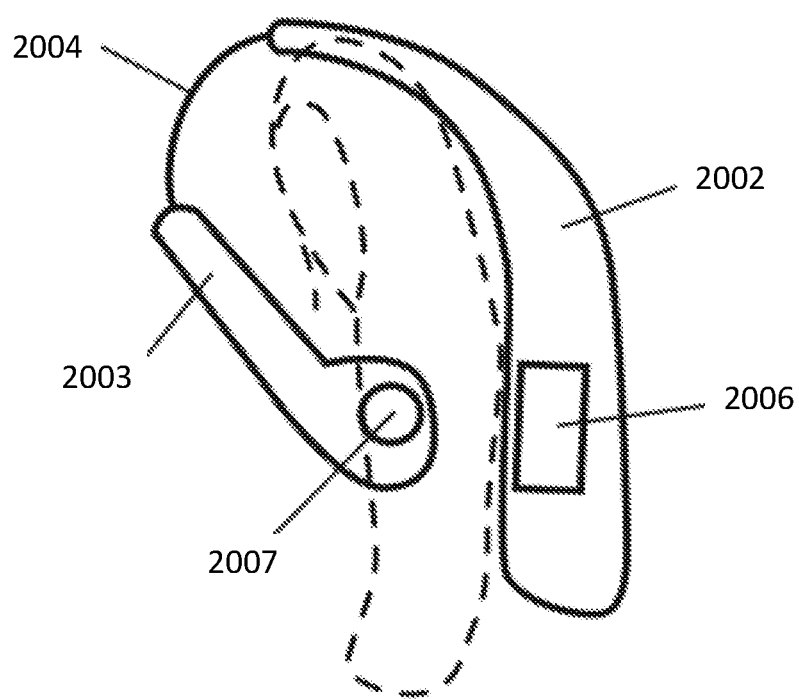
FIG. 18 shows a view along the major plane of the ear with the wearable device of FIG. 15 positioned on the ear of a user.
Figure 19:
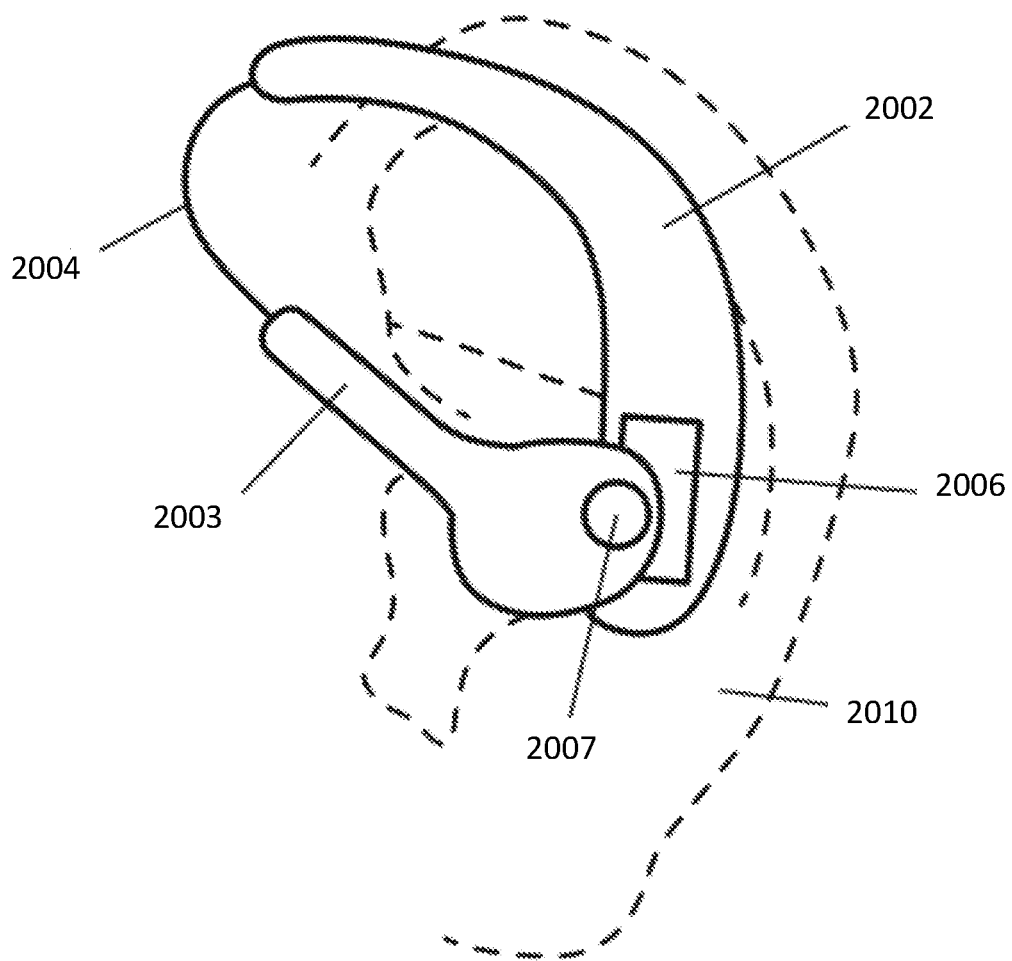
FIG. 19 shows a side view of the ear, normal to the view shown in FIG. 18, with the wearable device of FIG. 15 positioned on the ear of a user.

In use the body section 2004 is hooked over about the ear of a user as shown in FIGS. 18 and 19 and the earpiece 2003 is brought into alignment with the body section 2002 so that magnets 2006 and 2007 are strongly attracted to one another and hold the body section 2002 and earpiece 2003 tightly against a user's ear. The magnets are positioned and the earpiece 2003 and body section 2002 configured so that the magnets are proximate the concha of a user's ear when in use. Attachment in this region securely attaches the device to a user's ear and forces the earpiece and body section towards the ear to secure them in place. Further, the end of the body section 2002 proximate cable 2004 may be flexible so that as the magnets attract the distal end of the body section may wrap around the ear of a user to tightly conform to the shape of the ear. Alternatively or additionally cable 2004 may be formed of a stretchable material to enhance this effect.

Figure 20:
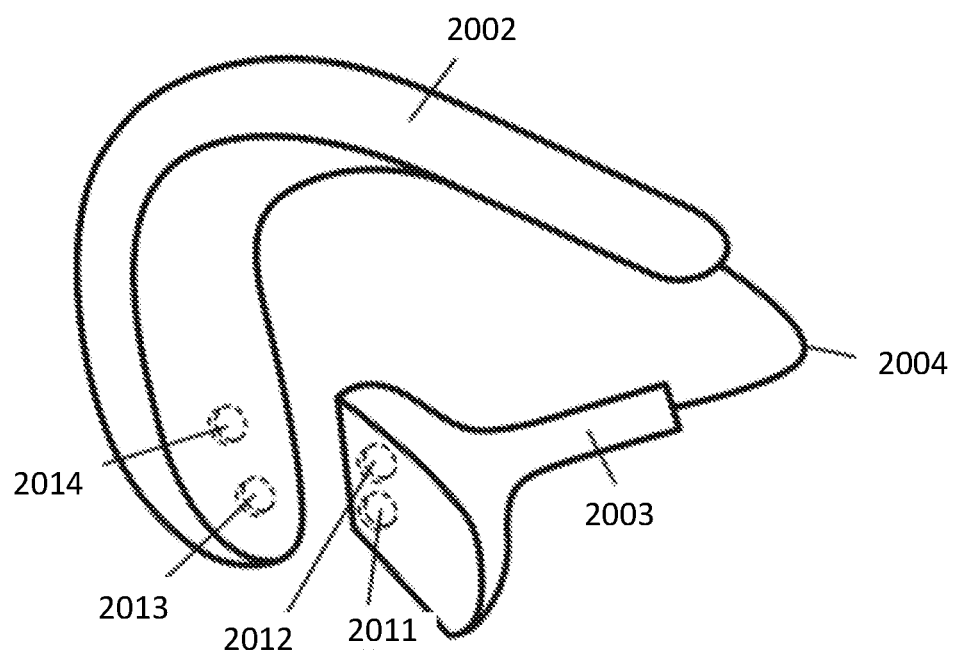
FIG. 20 shows a perspective view of a wearable device according to another embodiment.

Referring now to FIG. 20 a modified embodiment for controlling earpiece and body section alignment is shown (like components being given like numerals). In this embodiment a pair of magnets 2011 and 2012 are provided on earpiece 2003 and a corresponding paid of magnets are provided on body section 2002. Magnets 2012 and 2014 attract each other and magnets 2011 and 2013 also attract each other. This arrangement prevents rotation of the earpiece relative to body section 2002 to provide more precise alignment.

Figure 21:
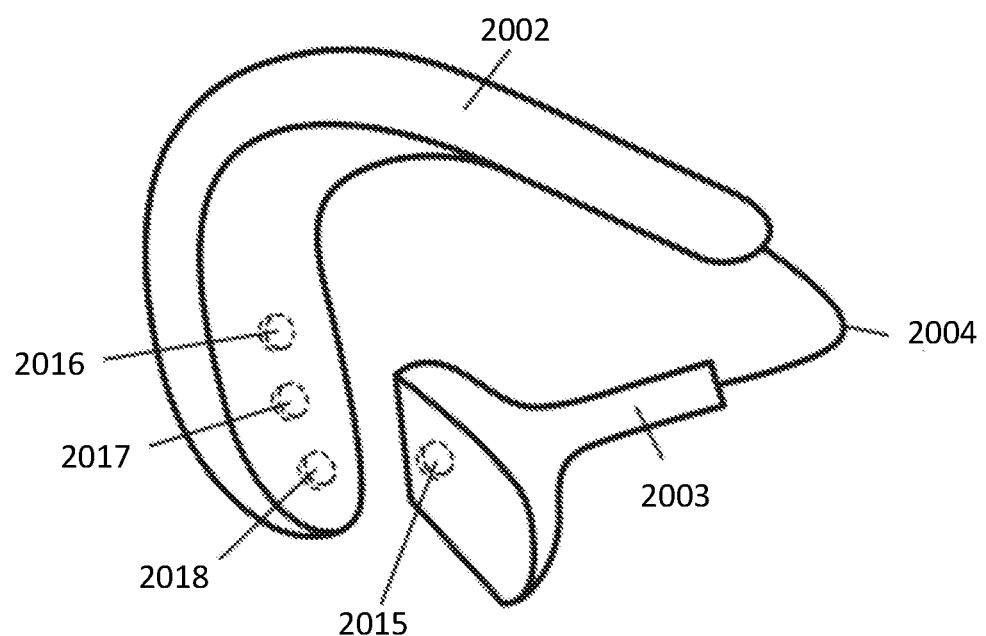
FIG. 21 shows a perspective view of a wearable device according to a further embodiment.

Referring now to FIG. 21 a further modified embodiment is shown (like components being given like numerals). In this case one magnet 2015 is provided on earpiece 2003 and a series of magnets are provided on body section 2002. This allows a user to align magnet 2015 with any one of magnets 2016 to 2018 in the position providing the best fit. This allows one design to fit tightly for a range of ears sizes. It will be appreciated that more than one magnet may be provided on earpiece 2003. For example, if two magnets are provided they may align with either magnets 2016 and 2017 or 2017 and 2018. This provided both the adjustability of this embodiment and the anti-rotation aspect of the previous embodiment.

Figure 22:
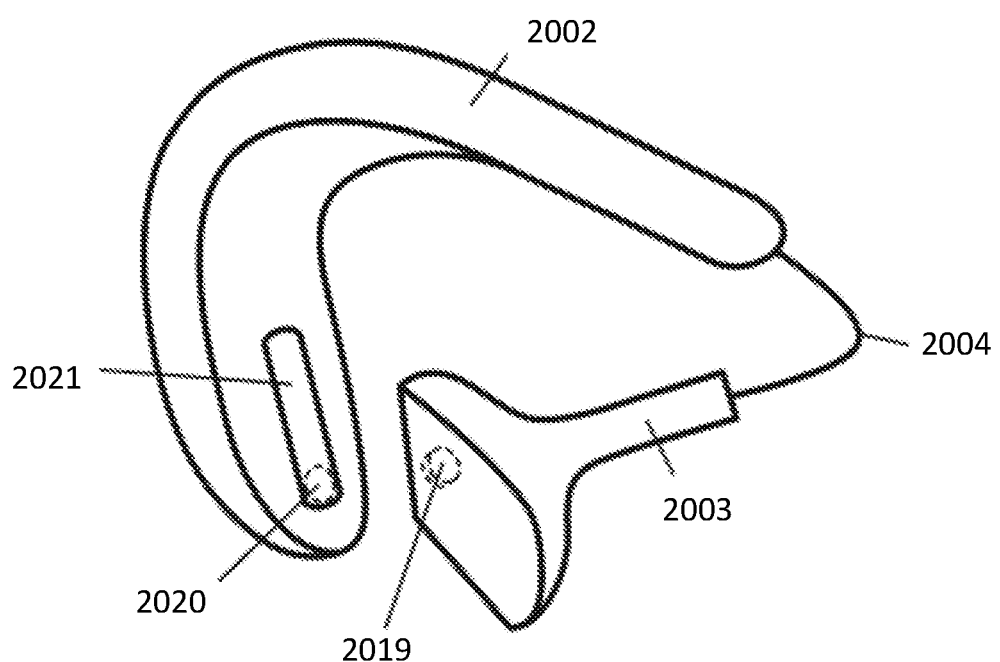
FIG. 22 shows a perspective view of a wearable device according to a further embodiment.

FIG. 22 shows a further embodiment in which a single magnet 2019 is provided on earpiece 2003 and a single magnet 2020 is provided in a track 2021 on body section 2002. The magnet 2020 may slide along track 2020 to be positioned in the optimum position for a user's ear.

Figure 23:
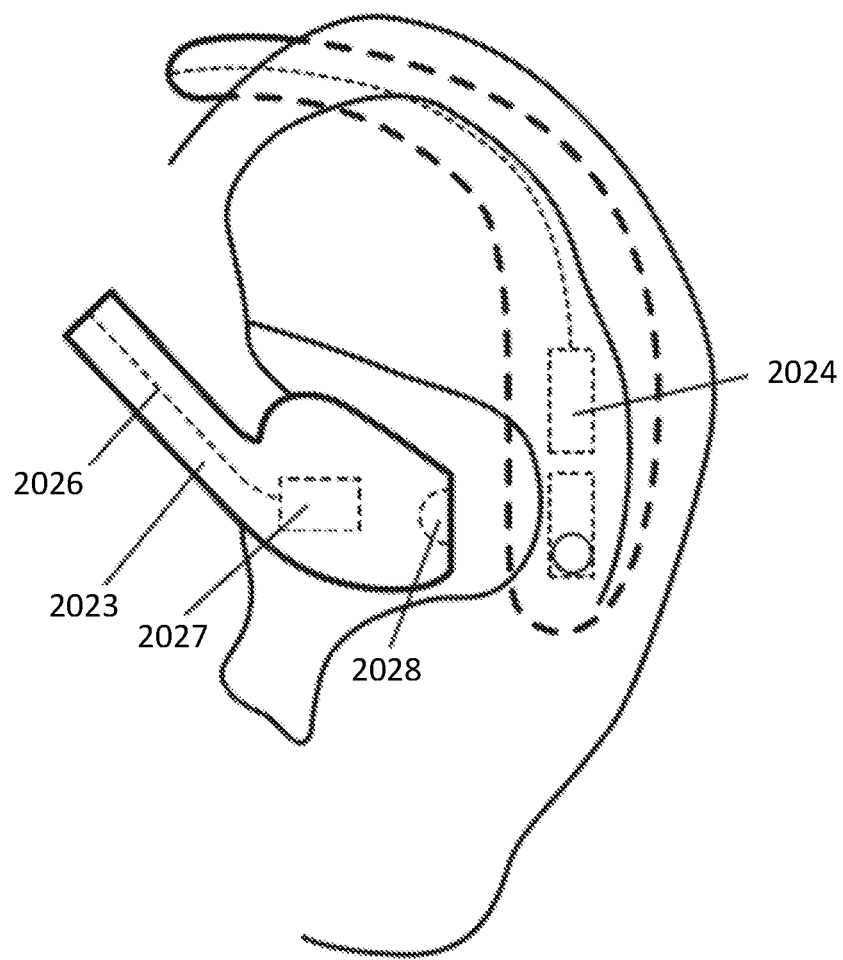
FIG. 23 shows a perspective view of a wireless wearable device according to a further embodiment.
Figure 24:
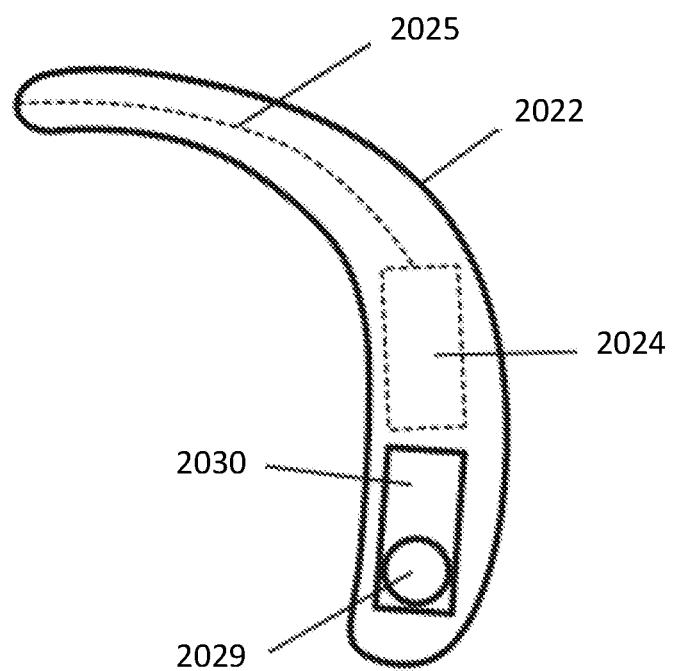
FIG. 24 shows the body section of the wearable device shown in FIG. 23.

Referring now to FIGS. 23 and 24 a wireless embodiment is shown including a body section 2022 and an earpiece 2023 having similar form to those shown in the previous embodiments. However, in this embodiment circuit 2024 of body section 2022 communicates wirelessly via antenna 2025 to antenna 2026 and circuit 2027 of earpiece 2027. In this embodiment a single magnet 2028 is provided on earpiece 2023 and a single magnet 2029 is provided in a track 2030, similar to the embodiment of FIG. 22. It will be appreciated that the other embodiments may be adopted in a wireless solution too.

Figure 25A:
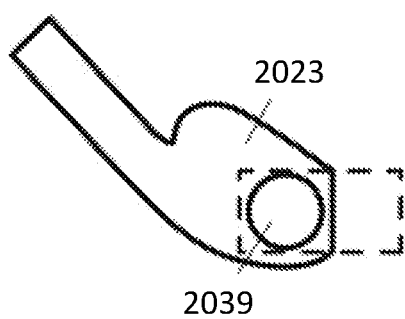
FIGS. 25a and 25b show an earphone with an extendable magnet.
Figure 25B:
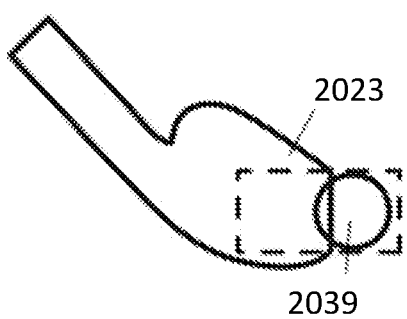

FIGS. 25a and 25b show a modified earpiece design in which a magnet 2039 may be positioned in a first retracted position with respect to earpiece 2023 as shown in FIG. 25a and a second extended position in which magnet 2039 may be positioned in an extended position with respect to earpiece 2023 as shown in FIG. 25b. In this manner the positioning of magnet 2039 with respect to earpiece 2023 may be continuously adjusted to optimally position the earpiece 2023 with respect to a user's ear.

Figure 26:
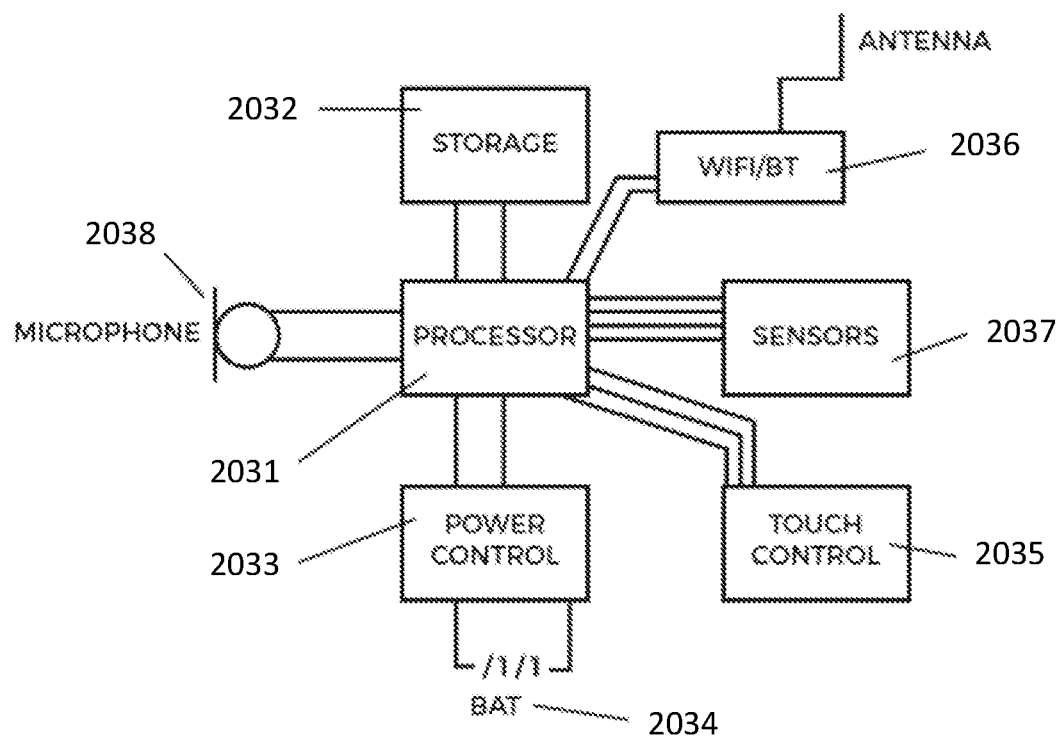
FIG. 26 Shows a block circuit diagram of a circuit for use with a wearable device.

Referring now to FIG. 26 circuit 2024 is shown in block diagram form. It will be appreciated that this circuit may also be utilized in the previous embodiments. It will also be appreciated that some or all of the components may be incorporated in a wearable device depending upon the functionality required.

Circuit 2024 includes a microprocessor 2031 having associated storage 2032, typically flash RAM, and a power supply 2033 supplying power from a battery 2034. Microprocessor 2031 may include a media player to play music stored in storage 2032 or supplied as a stream from communications circuit 2036. Battery 2034 may be recharged via a cable or wirelessly. User inputs 2035, such as touch sensors, allow user control of volume, mode, content etc. A communications circuit communicates with earpiece 2023 to supply a signal to drive a speaker via circuit 2027 as well as to communicate with external devices. Such external communications may include Wi-Fi, Bluetooth, cellular or other wireless communications to upload or stream content.

A range of sensors 2037 may be connected to microprocessor 2031 such as biometric or other sensors including a heart rate monitor, temperature sensor, movement sensor, accelerometer, location sensor, GPS, gyroscope, altimeter etc.

A microphone 2038 may also be provided for user control via a voice recognition system or to monitor environmental sound. The microphone may also be employed in a noise cancellation system.

As well as providing a record of user activity the biometric and other sensors may be used to intelligently control operation of the wearable device. The output volume of a signal supplied to the earpiece may be adjusted based on the output of one or more biometric sensor (e.g. louder during intense activity or loud background noise). A play list stored in storage 2032 may be selected based on the intensity of user activity. A water sensor may be provided which pauses music when the water detector detects the presence of water.

The wearable device may also communicate location and/or biometric data to a cloud based system that analyses biometric and location data and provides coaching tips, directions and other derived information to a user.

A sensor may also detect when the positioning magnets are properly aligned and generate a sound to indicate good alignment.

There is thus provided a wearable device with the following advantages:
a. Increased stability of the device on the ear during energetic and varied movements.
b. Centring the mass of the device on the ear in a way that increases the strength of the anchoring.
c. Appropriate centre of mass and weight distribution for attachment during energetic and varied movements.
d. Correct balance of pull force and cushioning to ensure secure hold over long periods of time, without causing discomfort.
e. Standardisation of sizing allows for fit on wide range of ear shapes for mass market.
f. Magnetic system is easy to integrate into existing manufacturing processes.
g. Improved positioning of earbud to rest in good position for audio consumption.

Exemplary Embodiments

In examples, a wearable device for attachment to an ear of a user includes: an earpiece including a speaker and a first magnetic element; and a body section including a hook for attachment about the ear and a second magnetic element, wherein the earpiece is movable relative to the body section and the earpiece and body section are configured so that when the body section is hooked about the ear the first magnetic element and second magnetic element are adapted to be magnetically attracted to each other through the ear to retain the device in place.

In examples, the second magnetic element is positioned so as to be proximate the concha of the ear when the body section is worn on the ear of the user.

In examples, the hook is dimensioned to surround a circle having a radius of between 20 to 32 mm.

In examples, the hook is dimensioned to surround a circle having a radius of between 25 mm to 27 mm.

In examples, the hook is twisted so as to direct the weight of the body section into the user's skull.

In examples, the hook is flexible to wrap around the ear of a user.

In examples, the earpiece is connected to the body section via a flexible section.

In examples, the first and second magnetic elements are proximate each other the flexible section is drawn around the ear of a user in use.

In examples, the first magnetic element is located at a distal end of earpiece.

In examples, the earpiece includes a face at its distal end that is inclined at an angle of between plane 30° and 60° with respect to a face of the earpiece that engages a user's ear in use.

In examples, the earpiece includes a face at its distal end that is inclined at an angle of between plane 48° and 55° with respect to a face of the earpiece that engages a user's ear in use.

In examples, the earpiece is separate from the body section.

In examples, the earpiece communicates with the body via a wireless connection.

In examples, the body includes multiple magnets spaced at intervals to enable attachment of the earpiece at a plurality of positions to suit a range of ear shapes.

In examples, the first and second magnetic elements produce magnetic fields which maintain the earpiece in a desired orientation relative to the body.

In examples, the body section includes an extendable section to adjust the relative position of the second magnetic element with respect to the body section to allow adjustment of the position of the second magnetic element to accommodate different ear shapes.

In examples, the earpiece includes an extendable section attached to the first magnetic element allowing positioning of the first magnetic element towards or away from the earpiece to allow adjustment to accommodate different ear shapes.

In examples, the first magnetic element is a magnet having a volume of between 6 mm$^3$ and 440 mm$^3$.

In examples, the first magnetic element has a volume of between 150 mm$^3$ and 175 mm$^3$.

In examples, the magnetic field strength of the magnet is between 368 gauss and 1200 gauss.

In examples, the second magnetic element is a magnet having a volume of between 2 mm$^3$ and 63,000 mm$^3$.

In examples, the second magnetic element has a volume of between 400 mm$^3$ and 440 mm$^3$.

In examples, the magnetic field strength of the magnet is between 4500 gauss and 8000 gauss.

In examples, the wearable device includes a microprocessor housed in the body section.

In examples, the microprocessor includes a media player.

In examples, the wearable device includes one or more biometric sensor selected from a heart rate monitor, temperature sensor, movement sensor, microphone, accelerometer, location sensor, GPS, gyroscope, altimeter and acoustic sensor.

In examples, the wearable device includes a voice recognition system.

In examples, the wearable device includes a noise cancellation system.

In examples, the output volume of a signal supplied to the earpiece is adjusted based on the output of one or more biometric sensor.

In examples, a play list is adjusted based on the output of one or more biometric sensor.

In examples, the wearable device includes a water sensor and wherein the media player pauses play when the water detector detects the presence of water.

In examples, the wearable device includes a wireless communication circuit for uploading or streaming content from another device.

In examples, the wireless communication circuit is capable of communicating with a cellular communication system.

In examples, the wearable device is adapted to communicate location and/or biometric data to a cloud based system that analyses biometric and location data and provides coaching tips, directions and other derived information to a user.

In examples, a coating is applied to portions of the body section formed of a thermoplastic elastomer or silicone material.

In examples, the coating has hardness range between Shore A 30 to Shore A 90.

In examples, the coating has hardness range of about Shore A 40.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A wearable device for attachment to an ear of a user, the wearable device comprising:
   an earpiece including a speaker; and
   a body section including a hook for attachment about the ear of the user;
   wherein the earpiece is configured so that a length of the earpiece can be adjusted; and
   wherein the earpiece and the body section are configured so that the earpiece can rotate relative to the body section about an axis of rotation transverse to a main plane passing through the body section and the hook.

2. A wearable device as claimed in claim 1, wherein:
   the earpiece further includes a first magnetic element;
   the body section further includes a second magnetic element; and
   the earpiece and body section are configured so that when the body section is hooked about the ear, the first magnetic element and second magnetic element are adapted to magnetically couple through the ear to retain the wearable device in place.

3. A wearable device as claimed in claim 2, wherein the second magnetic element is positioned so as to be proximate the concha of the ear when the body section is attached to the ear of a user.

4. A wearable device as claimed in claim 2, wherein the first magnetic element comprises a plurality of magnetic sub-elements spaced at intervals such that the first magnetic element and second magnetic element can be magnetically coupled through the ear at a plurality of positions.

5. A wearable device as claimed in claim 1, wherein, when the body section is attached to the ear of the user, the earpiece is configured to rotate relative to the body section about a point of rotation located within a region defined by the perimeter of the concha of the ear.

6. A wearable device as claimed in any one of the preceding claims, wherein:
   the wearable device includes a connector; and
   the earpiece is configured to rotate relative to the body section about a rotatable connection to the connector.

7. A wearable device as claimed in claim 1, wherein the earpiece includes a magnetic element configured to allow rotation of the earpiece relative to the body section.

8. A wearable device as claimed in claim 1, wherein the earpiece is configured to be continuously rotatable in relation to the body section.

9. A wearable device as claimed in claim 1, wherein the earpiece is configured to rotate between a plurality of discrete angular positions relative to the body section.

10. A wearable device for attachment to an ear of a user, the wearable device comprising:
    an earpiece including a speaker and a first magnetic element;
    a body section including a hook for attachment about the ear of a user and a second magnetic element; and
    a magnetometer configured to measure a magnitude of a magnetic field;
    wherein the earpiece and body section are configured so that when the body section is hooked about the ear, the first magnetic element and second magnetic element are adapted to magnetically couple through the ear to retain the device in place; and wherein the magnetometer is configured and arranged to detect a degree of magnetic coupling between the first magnetic element and the second magnetic element.

11. A wearable device as claimed in claim 10, wherein the detected degree of magnetic coupling is at least partially indicative of under-coupling between the earpiece and body section when the detected degree of magnetic coupling is below a first threshold.

12. A wearable device as claimed in claim 10, wherein the detected degree of magnetic coupling is at least partially indicative of adequate coupling between the earpiece and body section when the detected degree of magnetic coupling is equal to or above a first threshold and below a second threshold.

13. A wearable device as claimed in claim 10, wherein the detected degree of magnetic coupling is at least partially indicative of over-coupling between the earpiece and body section when the detected degree of magnetic coupling is equal to or above a second threshold.

14. A wearable device as claimed in claim 10, wherein the detected degree of magnetic coupling is at least partially indicative of a storage state when the detected degree of magnetic coupling is equal to or above a third threshold.

15. A wearable device as claimed in claim 10, wherein the wearable device is configured to provide feedback to the user based at least partially on the detected degree of magnetic coupling.

16. A wearable device as claimed in claim 15, wherein the feedback indicates that the earpiece and body section are adequately coupled.

17. A wearable device as claimed in claim 10, wherein the wearable device is configured to adjust the coupling between the earpiece and body section in response to the detected degree of magnetic coupling.

18. A wearable device as claimed in claim 10, wherein the wearable device is configured to enter a device mode at least partially based on the detected degree of magnetic coupling.

19. A wearable device as claimed in claim 10, wherein the magnetometer is a Hall effect sensor.

* * * * *